US005267848A

United States Patent [19]

Totsuka

[11] Patent Number: 5,267,848

[45] Date of Patent: Dec. 7, 1993

[54] APPARATUS FOR MANUFACTURING SHEETS

[75] Inventor: Akio Totsuka, Chiba, Japan

[73] Assignee: Nippon Petrochemicals Company, Limited, Japan

[21] Appl. No.: 828,872

[22] PCT Filed: May 30, 1991

[86] PCT No.: PCT/JP91/00727

§ 371 Date: Feb. 3, 1992

§ 102(e) Date: Feb. 3, 1992

[87] PCT Pub. No.: WO91/18721

PCT Pub. Date: Dec. 12, 1991

[30] Foreign Application Priority Data

Jun. 1, 1990 [JP] Japan .................................. 2-141583

[51] Int. Cl.[5] ........................ B29C 47/14; B65G 57/08

[52] U.S. Cl. ........................................ 425/297; 83/90; 83/94; 83/95; 264/146; 264/148; 264/160; 425/305.1; 425/307; 425/308; 425/403.1; 425/461; 414/788.6

[58] Field of Search ............... 425/296, 297, 301, 307, 425/403.1, 308, 461, 133.5, 302.1, 404, 315, DIG. 201, 436 R, 403.1, 305.1; 264/146, 148, 151, 147, 153, 160; 83/86, 92, 90, 95, 102, 94; 414/788.6, 791.4, 791

[56] References Cited

U.S. PATENT DOCUMENTS 3,475,526 10/1969 Seto .................................... 264/153
3,801,406 4/1974 Debenedetti ........................ 264/148
3,844,201 10/1974 Eggert ................................ 554/156
4,129,632 12/1978 Olson et al. .......................... 264/146
4,287,147 9/1981 Hungerford ........................ 264/146
4,415,515 11/1983 Rosenberg ............................ 264/68
4,440,702 4/1984 Susnjara ............................. 425/301
4,447,479 5/1984 Harrison et al. .................... 264/153
4,459,093 7/1984 Asano ................................. 425/297
4,649,007 10/1987 Bonis .................................. 264/148
4,655,981 4/1987 Nielsen et al. ...................... 425/304
4,808,357 2/1989 Bourcier et al. .................... 264/151
4,815,924 3/1989 Jaatinen ................................. 83/90

FOREIGN PATENT DOCUMENTS 3042042 6/1981 Fed. Rep. of Germany ...... 264/146
3618384 12/1987 Fed. Rep. of Germany .
47-31985 9/1972 Japan .
50-107585 8/1975 Japan .
57-151309 9/1982 Japan .
58-56332 12/1983 Japan .
64-9732 1/1989 Japan .

*Primary Examiner*—Khanh P. Nguyen
*Attorney, Agent, or Firm*—Scully, Scott, Murphy & Presser

[57] ABSTRACT

For the purpose of mass-producing sheet pallets made of a synthetic resin with a high productivity and without difficulty, an apparatus for manufacturing sheets is provided, which apparatus includes a process (1001) to feed sheet materials in a predetermined shape and having corner portions, a process (1002) to form sheets of a desired shape by cutting at least the corner portions of said sheet materials and a process (280) to stack said sheets

10 Claims, 20 Drawing Sheets

APPARATUS FOR MANUFACTURING SHEETS

TECHNICAL FIELD

This invention relates to an apparatus for manufacturing sheet pallets and other sheet materials such as tier sheets which are made of synthetic resins. The sheet pallets are used for carrying, transporting and storing several goods and tier sheets are inserted between adjacent layers of small containers which are stacked in layers to form a unit load.

BACKGROUND ART

As compared with wooden pallets, sheet pallets are light in weight and small in thickness and they excel in load carrying capacity and storing efficiency. Accordingly, the sheet pallets have spread rapidly.

FIG. 23 shows an example of a sheet pallet made of synthetic resin. The sheet pallet 1 comprises a rectangular sheet 11 made of a synthetic resin. The four corners 12 of the sheet 11 are rounded. A tab section 13 is formed in the periphery of one side edge which is folded at a score 15 (folding groove). Loads are place on the upper face 14 of the sheet pallet 1.

There has never been proposed an integrated through process for producing sheet pallets 1 of this kind. In other words, a part of production line for other goods was diverted to produce sheet pallets. Accordingly, the productivity was low and mass production was impossible. In addition, it was quite difficult to produce sheet pallets of various sizes and shapes.

The invention has been accomplished for the purpose to solve the above problems. It is, therefore, the object of the present invention to provide an apparatus for manufacturing sheets, which apparatus is high in productivity and which is possible to produce sheets of various sizes with low labor cost.

DISCLOSURE OF INVENTION

In order to attain the above object, the present invention provides an apparatus comprising a feeding means for feeding sheet materials having corner parts, a forming means for forming the sheet materials into a predetermined shape with at least cutting the corner parts thereof and a storing means for storing the formed sheets.

The above feeding means may be provided with a web forming means to form a strip of web material made of a synthetic resin and a sheet material forming means to form sheet materials by cutting the sheet web. This sheet material forming means may comprise a first cutting means to trim the sheet web into a predetermined width and a second cutting means to cut the trimmed web into predetermined length.

Furthermore, the above-mentioned feeding means may be provided with a web supplying means to feed a previously formed strip of web of a predetermined width and a third cutting means to cut the web into a predetermined length. Or the feeding means may be provided with a storing section to store the sheet materials of a predetermined shape and a delivery means to take out the sheet materials from the storing section.

The above forming means may have a corner cutting means to cut corner portions of the sheet material and a score forming means to form a folding score in the periphery of the sheet material.

With the above-described apparatus, a feeding step to feed sheet materials in a predetermined shape and having corner parts, a forming step to form sheets of desired shape by cutting the corner parts of sheet materials, and a stacking step can be carried out continuously.

BRIEF DESCRIPTION OF DRAWINGS

FIGS. 1 to 13 show a first embodiment of the present invention, wherein

FIGS. 1 and 2 are schematic side views of a sheet pallet manufacturing apparatus;

FIG. 5 is a perspective view of a stacking device;

FIG. 13 is a perspective view of stacked sheet pallets:

FIGS. 17 to 21 show a modified embodiment of a punching device, wherein FIG. 17 is a plan view of a punching device;

FIG. 18 is a cross-sectional side elevation taken along the line X—X in so FIG. 17;

FIG. 19 is a cross-sectional side elevation taken along the line Y—Y in FIG. 17;

FIG. 20 is a vertical and central cross-sectional view of a die as viewed from the right side;

FIG. 21 is a cross-sectional plan view taken along the line Z—Z in FIG. 20;

BEST MODE FOR CARRYING OUT THE INVENTION

The first embodiment of the present invention will be described with reference to FIGS. 1 to 13.

Figure 1:
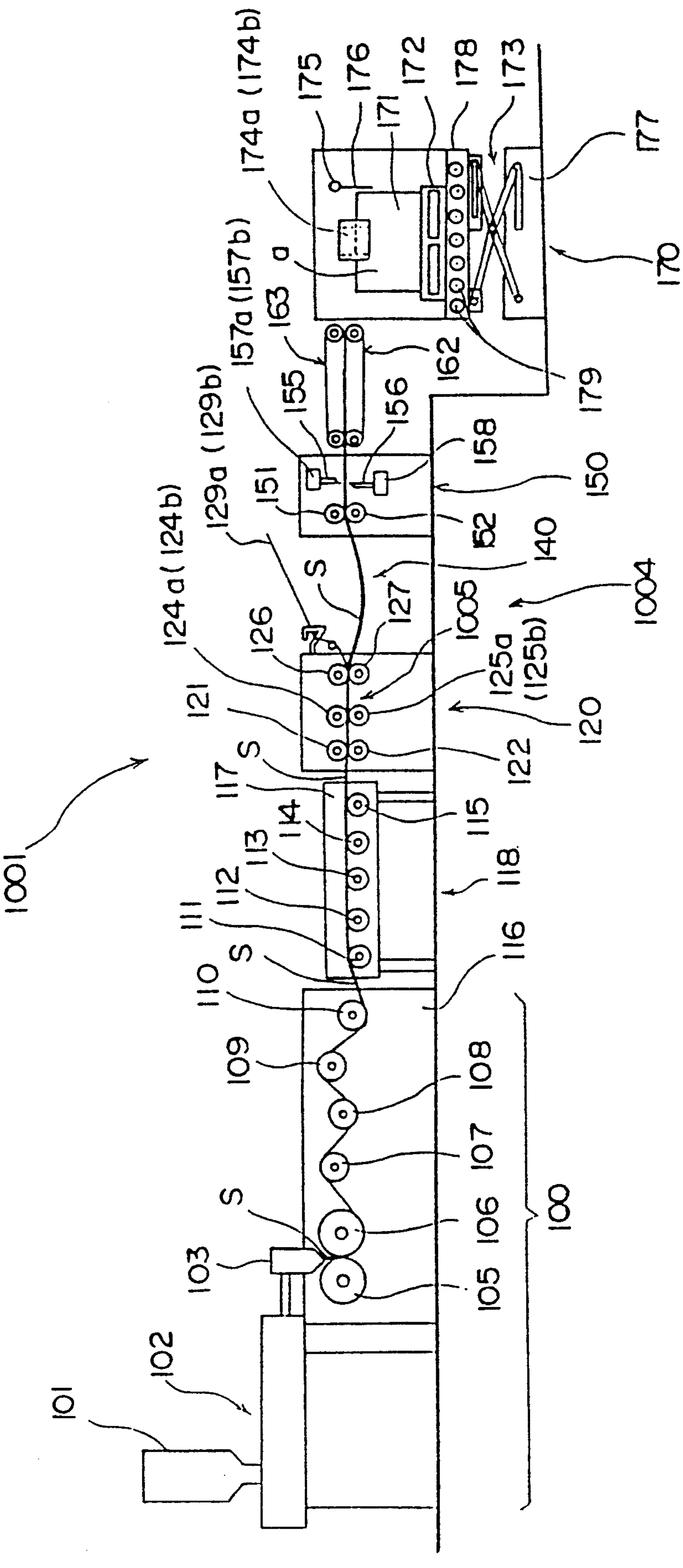
Figure 2:
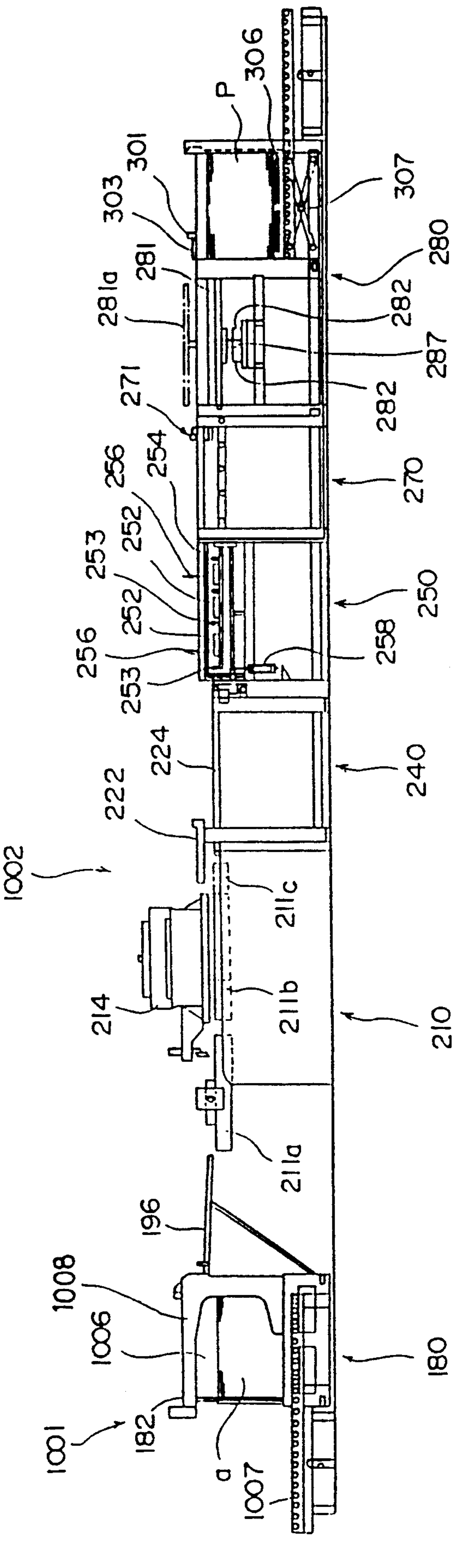

In FIGS. 1 and 2, the numeral 1001 denotes a feeding device (feeding means) to feed rectangular sheet materials a. A forming device 1002 is installed on the downstream side of this feeding device 1001 which cuts the corner parts m of a fed sheet material a (cf. FIG. 8A) into an arcuate form and also forms a folding score b in a side edge portion so as to form the sheet material a into a sheet pallet P. On the downstream side of this forming device 1002 is provided a sheet pallet stacking device (storing means) 280 for storing sheet pallets P.

The above feeding device 1001 is provided with a web feeding device (web feeding means) 100 to feed a strip of web S made of a synthetic resin, a sheet material forming device (sheet material forming means) 1004 to form sheet materials a, a stacking device 170 to stack the sheet materials a, and a sheet feeding device 180 to feed these sheet materials a.

The above sheet material forming device 1004 is provided with a guide device (guide roll section) 118 to guide a web S fed from web feeding device 100, a pulling device 120 to receive this web S, and a web cutting device (second cutting means) 150 to cut the web S into sheet materials a of a predetermined length.

The foregoing forming device 1002 is provided with a punching device 210 to make sheet pallets P by punching the sheet materials a fed from the sheet feeding device 180, a removing table 240 to remove the peripheral portions after the punching, a tab forming device (folding device) 250 to form a tab portion c, and a stacking table 270 to stack a predetermined number of sheet pallets P.

The web feeding means 100 comprises a hopper 101, an extruder 102 to melt and plasticize a synthetic resin, and T-die 103 which is attached to the top end of the extruder 102. Installed in the downstream side of the T-die 103 are a roll 106 to emboss the front faces of sheet pallets P and a roll 105 to form the rear sides of sheet pallets P into specular surfaces. They are further followed by a roll 107, an annealing roll 108 to remove the strain in the web S by preheating, a roll 109, and a cooling roll 110. These rolls 105 to 110 are pivotally supported by a frame 116 of the apparatus.

The above guide device 118 is provided with freely rotating guide rolls 111 to 115, which are pivotally supported by a frame 117.

Figure 3A:
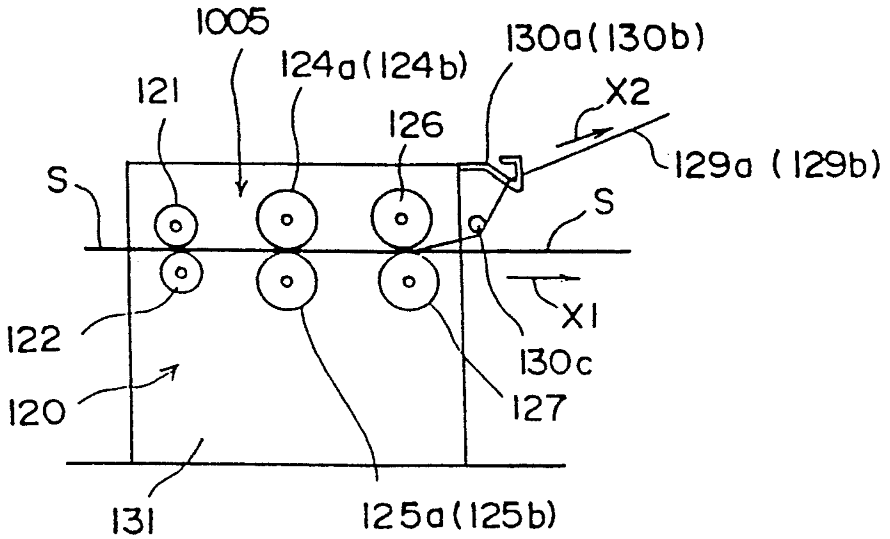
FIGS. 3A and 3B are a side view and a plan view of a pulling device.
Figure 3B:
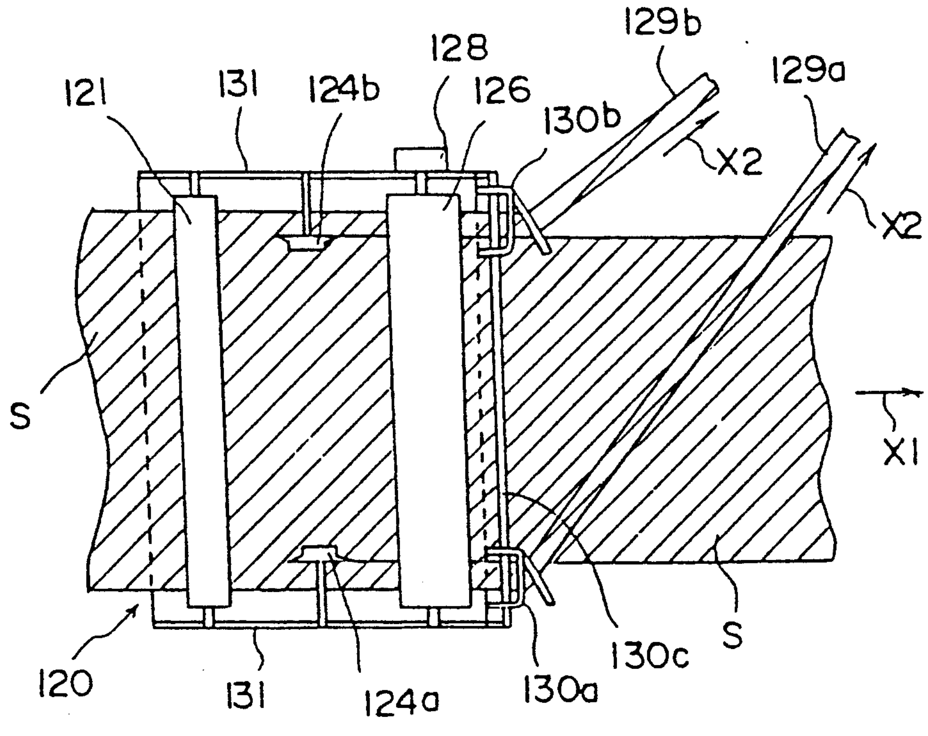

As shown in detail in FIGS. 3A and 3B, the above-mentioned pulling device 120 is provided with rolls 121, 122, 126 and 127 to receive the web S under a stretched condition, which web S is paid out of the web feeding device 100 through the guide device 118 (that is, the web S is brought into close contact with each roll under a certain tension). These rolls 121, 122, 126 and 127 are pivotally secured to the frame 131 of the pulling device 120. The rolls 121 and 122 are free supporting rolls and the rolls 126 and 127 are pulling rolls. The upper roll 126 is driven by a driving device 128. Between these rolls of 121, 122 and 126, 127, a border cutting device 1005 (first cutting device) is installed, which device trims the web S to a predetermined width. This border cutting device 1005 is provided with a pair of rotary cutting blades (shear cutter) **124*a* and 125*a* to cut the border on one side of the web S. Another pair or rotary cutting blades 124*b* and 125*b* are provided on the other side of the web S to trim the border on the other side. A bar 130*c* is attached to the downstream side of the rolls 126 and 127, which bar 130*c* is located above and transversely to the web S. The cut-off portions 129*a* and 129*b* of the web S are led out by members 130*a* and 130*b* which are attached above the bar 130*c*. The cut-off portions 129*a* and 129*b*** are subjected to size reduction by a crusher (not shown). Incidentally, they may be wound up.

Figure 4A:
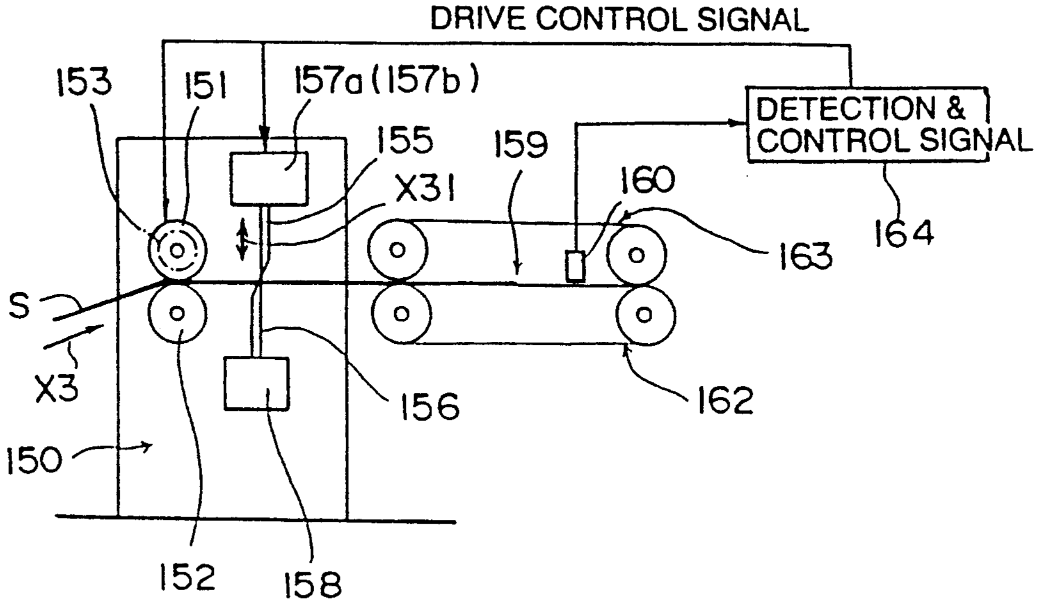
FIGS. 4A and 4B are a side view and a plan view of a web cutting device.
Figure 4B:
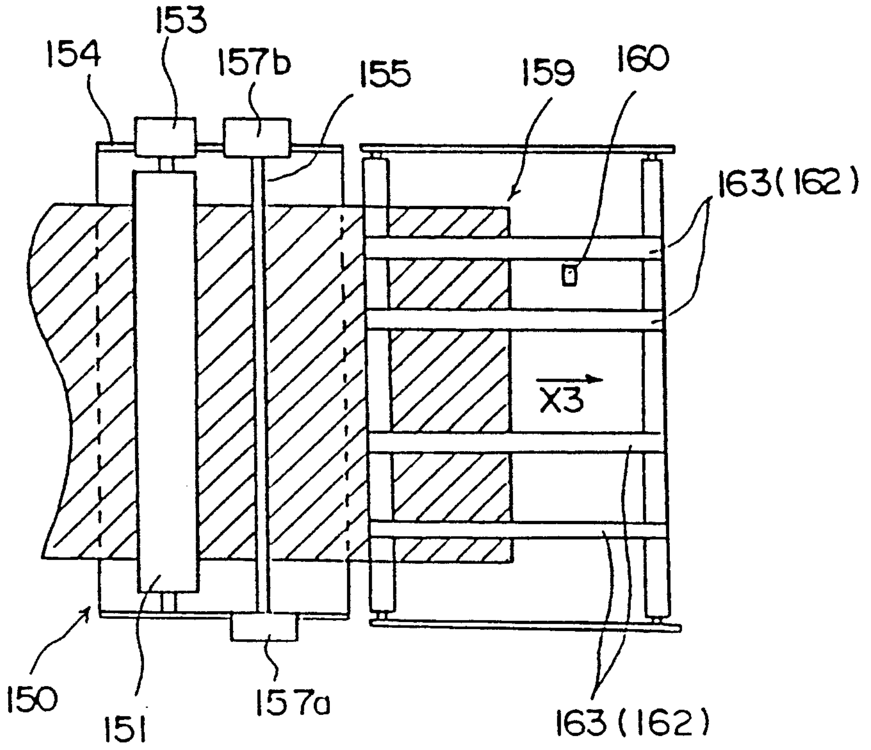

As shown in FIG. 1, a web cutting device 150 is installed next to the above pulling device 120 with interposing a slackening zone 140. When the web S is cut in this web cutting device 150, the shifting of web S is stopped in the web cutting device 150 as described later. Because the web S is continuously fed from the pulling device 120, the web S is slackened in this slackening zone 140 so as to adjust the operation of these steps. In other words, the above web cutting device 150 is provided with a pair of feed rolls 151 and 152 and a pair of guillotine-type shear blades 155 and 156, as shown in FIGS. 4A and 4B. The feed rolls 151 and 152 are pivotally secured to a frame 154 of the cutting device 150 and they are driven by a driving device 153. The lower cutting blade 156 is fixed to the frame 154 by means of a securing member 158. The upper cutting blade 155 can be moved vertically by means of driving devices **157*a* and 157*b* in the direction of an arrow X31. The numeral 160 denotes a limit switch which detects the foremost end 159 of the web S. The signal of the limit switch 160 is transmitted to a detection and control circuit 164 which produces control signals to control the functions of the driving device 153 for the feed roll 151 and the driving devices 157*a* and 157*b* for the cutting blade 155**.

The detection and control circuit 164 detects that the foremost end 159 of the web S is brought into contact with the limit switch 160 and, at this moment, the circuit 164 produces signals to stop the feed rolls 151 and 152 and to slide down the cutting blade 155. By this action, the web S is cut by the cutting blades 155 and 156 at the moment of contact of the foremost end 159 of web S with the limit switch 160, thereby forming a sheet material a of predetermined sizes. The setting position of the limit switch 160 can be adjusted.

The numerals 162 and 163 denote conveyor belts for moving forth the cut sheet materials a in the direction of an arrow X3.

Figure 5:
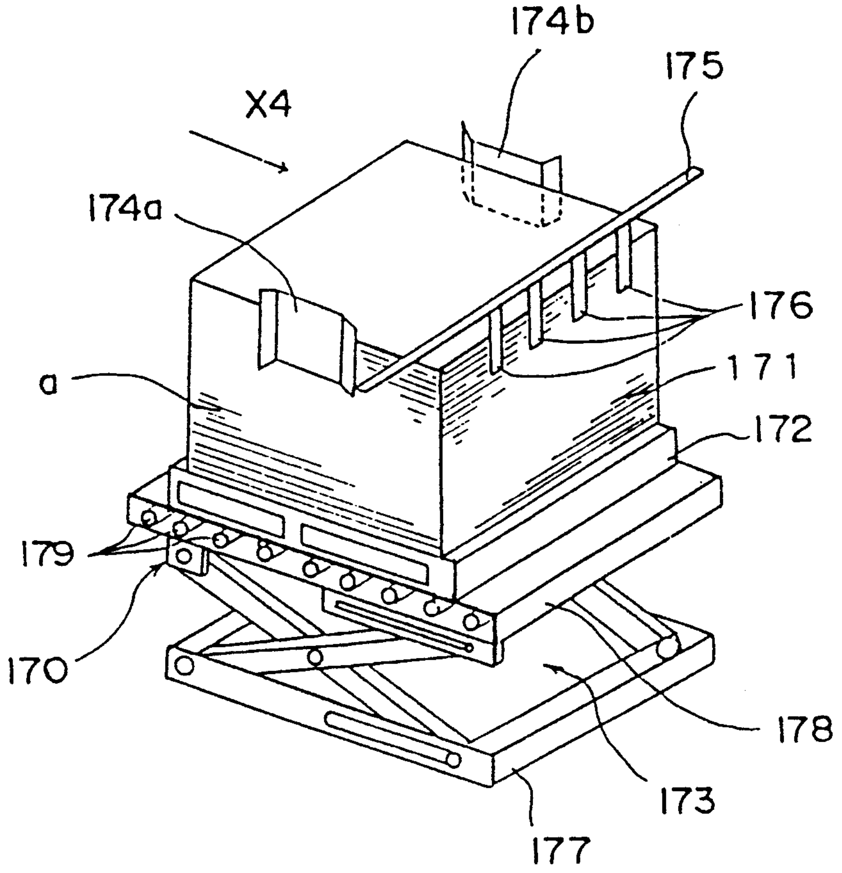

The sheet stacking device 170 stacks, as shown in FIG. 1, the sheet materials a fed by the conveyor belts 162 and 163. As shown in FIG. 5, the stacking device 170 is provided with a base plate 177, a pantograph-type link mechanism 173 which is installed on the base plate 177, and a vertically movable supporting plate 178 attached to the link mechanism 173. For example, a wooden pallet 172 is put on this supporting plate 178 and the sheet materials a which are fed from the direction of an arrow X4, are placed on the pallet 172. The numeral 171 denotes stacked sheet materials a. The supporting plate 178 is provided with a plurality of rollers 179 in order to facilitate the unloading of the sheet materials stacked on the wooden pallet 172.

In operation, the supporting plate 178 is so adjusted vertically by a link mechanism 173 that the uppermost part of the stacked sheet materials a (the position to receive a next sheet material a) is a little lower than the position of the sheet material a which is paid out from the conveyor belts 162 and 163.

It is necessary to adjust the position of a sheet material a relative to the position of already stacked sheet materials a (or the wooden pallet 172) when an additional sheet material a is fed from the direction of the arrow X4 and it is stacked. For this purpose, the stacking device 170 is provided with locating members **174*a*, 174*b* and 176. The members 176 are stoppers which are attached to a bar 175 that is secured to a frame (not shown). The sheet material a transferred in the direction of the arrow X4 is stopped by these stopper members 176, thereby attaining correct alignment in the direction of the processing line (the direction of the movement of web sheet S and sheet materials). The members 174*a* and 174*b* used for adjusting the transversal position of sheet materials a which are fed in the direction of the arrow X4. The locating members 174***a* and 174*b* are so attached to a frame that a sheet material a is introduced on the uppermost part of the sheet material in an appropriate transversal position.

As shown in FIG. 2, the sheet material feeding device 180 is provided with a container section 1006 to store the sheet materials a stacked by the sheet material stacking device 170 and a delivery device 1008 to deliver the sheet materials a.

The above container section 1006 is provided with a supporting table 1007 which supports the stacked sheet materials a.

Figure 6A:
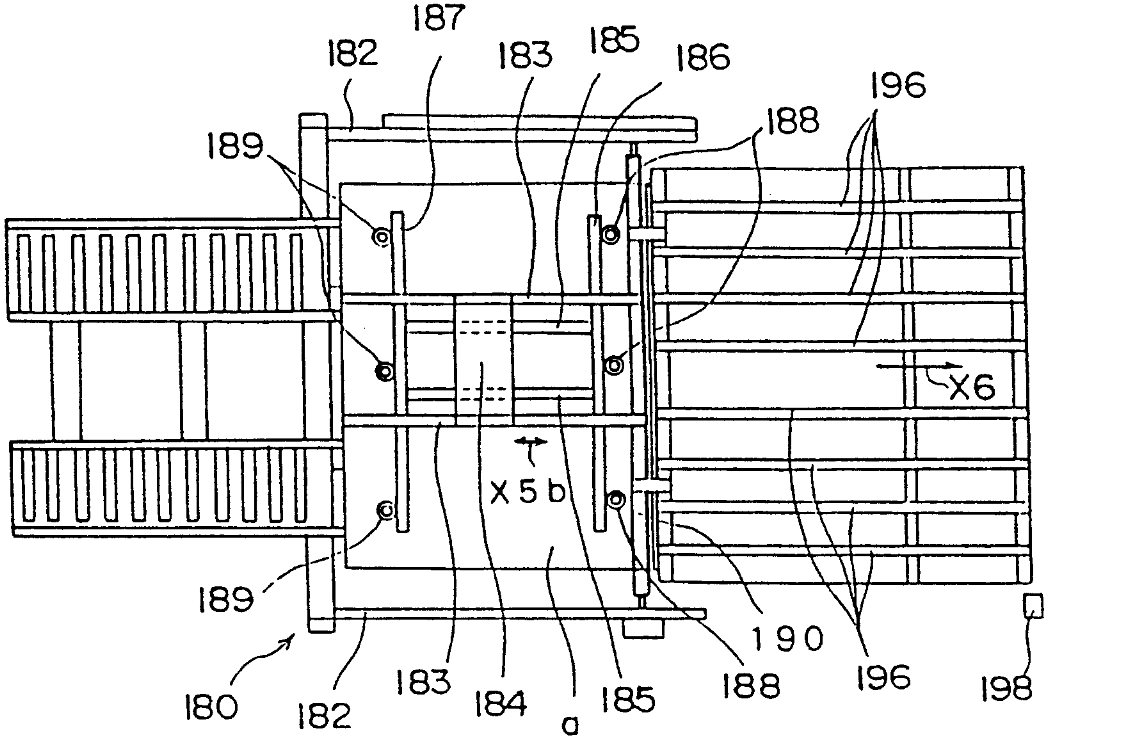
FIGS. 6A and 6B are a plan view and a side view of a sheet feeding device.
Figure 6B:
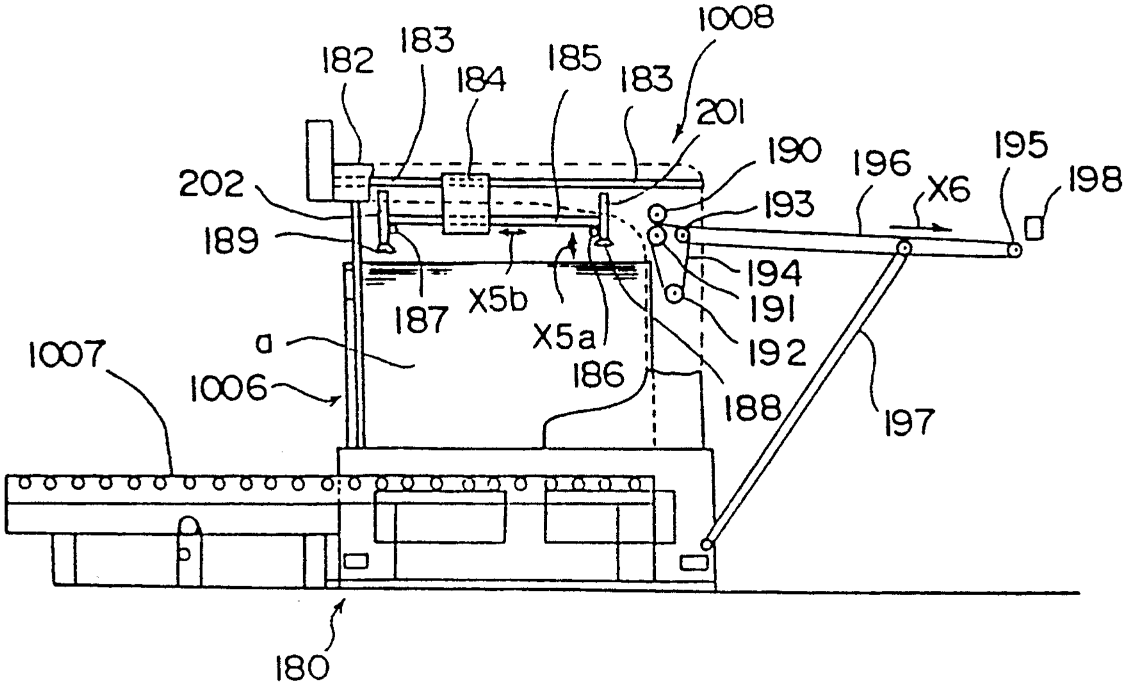

As shown in FIGS. 6A and 6B, the above delivery device 1008 is provided with suction mechanisms 188 and 189 which suck and move the front edge portion of the uppermost sheet material a held in the container section 1006. The suction mechanisms 188 and 189 are attached to the tips of cylinders 201 and 202, respectively. The suction mechanisms 188 and 189 can be moved vertically in the direction of an arrow X5*a* by driving the cylinders 201 and 202. The cylinders 201 and 202 are attached to transversal bar members 186 and 187. These bar members 186 and 187 are fixed to other set of bar members 185, which are perpendicular to the former bar members. These bar members 185 are supported by a driving device 184 that is attached to the frame 182 by means of bar members 183. It is possible to move the bar members 185 in the direction of an arrow X5*b* to and fro by actuating the driving member 184. Accordingly, the suction mechanisms 188 and 189 can be moved in the direction of the arrow X5*b* to move forth or back a sheet material a.

Furthermore, the sheet feeding device 180 is provided with feed rollers 190 and 191 to move forth sheet materials a paid out by the suction mechanism 188 and 189, conveyor belts 196 also to move forth the sheet material that is led by the feed rollers 190 and 191, rollers 193 and 195 that carry the conveyor belts 196, a roller 192 to drive rollers 191 and 193, a belt 194 which transmits the driving force of this driving roller to the rollers 191 and 192, supporting members 197 to support the conveyor belts 196, and a sensor 198 which detects the front edge of the sheet material shifted in the direction of the arrow X6 on the conveyor belts 196.

The sheet material a is temporarily stopped when its front edge is detected by the sensor 198. After the punching device 210 that is installed next to this sheet material feeding device 180, finished punching operation of a precedent sheet material a, the stopped sheet material a on the conveyor belts 196 is passed to the punching device 210 on the next stage. When it is confirmed that no sheet material a exists on the conveyor belts 196 by the sensor 198, the front edge of an uppermost sheet material a is shifted to the position between feed rollers 190 and 191 with the suction mechanisms 188 and 189. The sheet material a is passed through the feed rollers 190 and 191 and it is moved forth by the conveyor belts 196. When the front edge of the sheet material a is detected by the sensor 198, it is temporarily stopped. Thus, the sheet material a is held to stand ready on the conveyor belts 196 for the next punching operation.

Figure 7A:
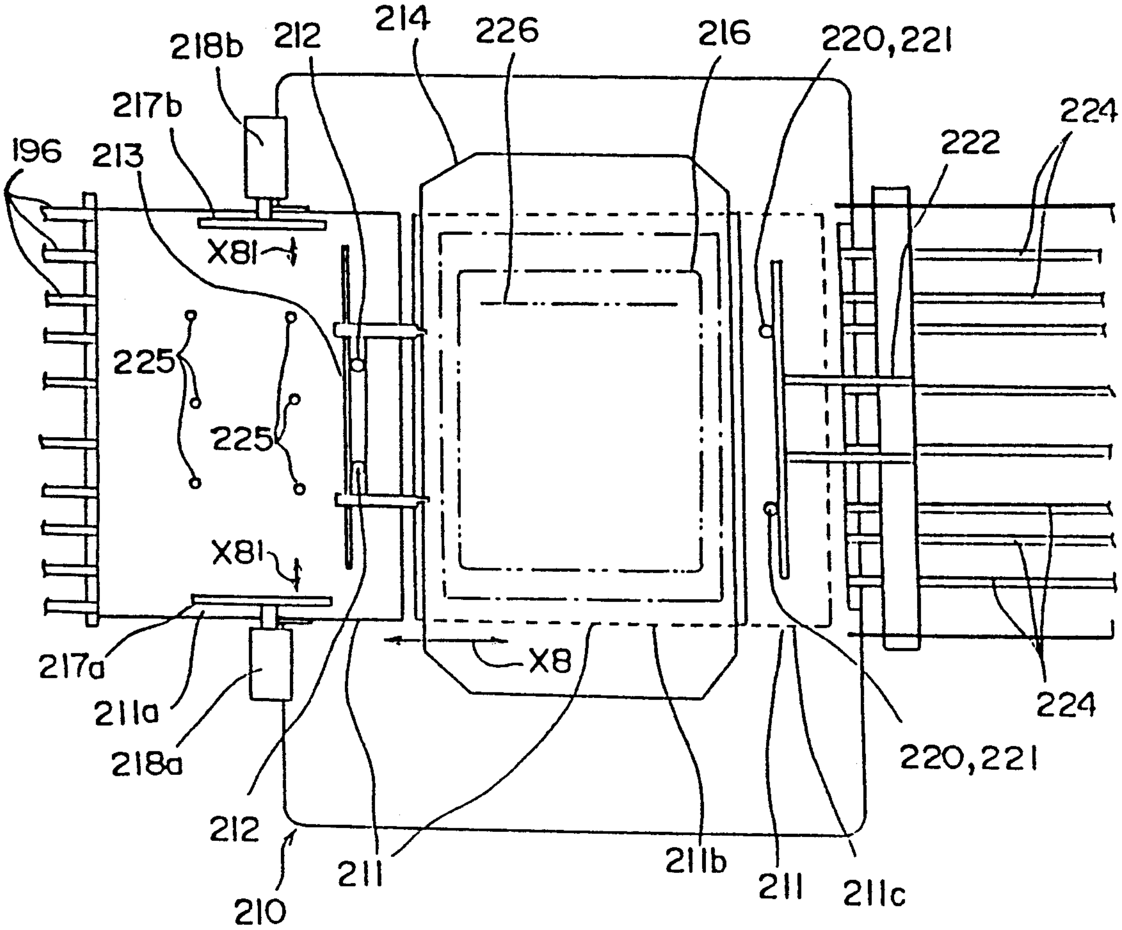
FIGS. 7A and 7B are a plan view and a side view of a punching device.
Figure 7B:
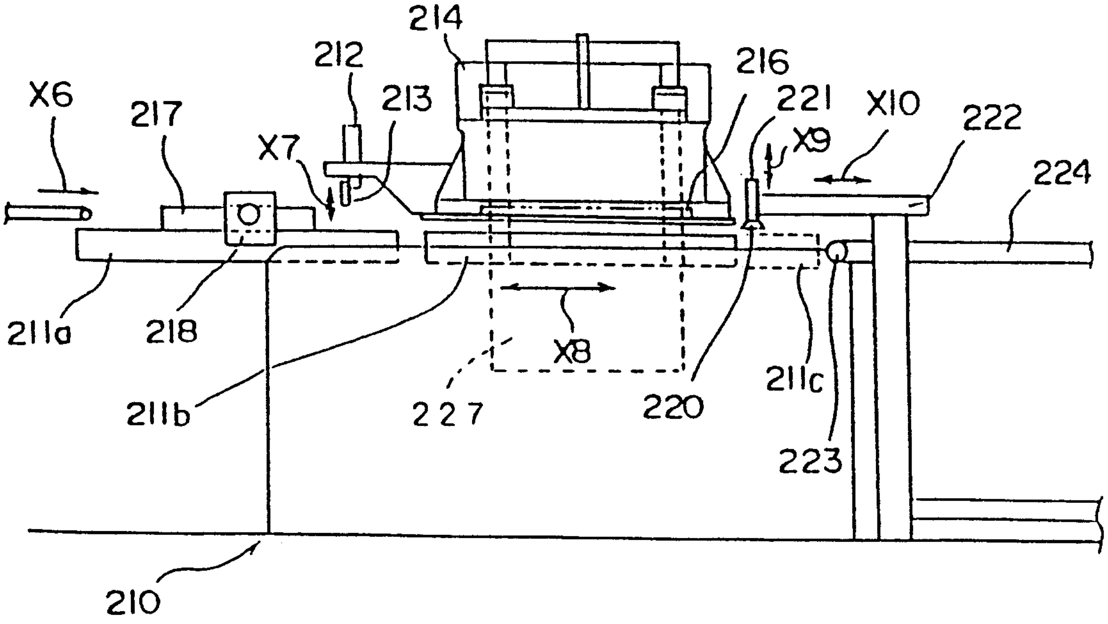

As shown in FIGS. 7A and 7B, the above sheet punching device 210 is provided with a slide table 211 which can be moved in the direction of an arrow X8. In the location of a numeral 211*a*, this table 211 receives the sheet material a on the conveyor belts 196 of the sheet material feeding device 180. This table 211 is then pushed up in the location of a numeral 211*b* and the sheet material a supported on the table is punched in the configuration 216. The sheet material a is then pass to the next stage in the location of 211*c*.

The numeral 213 is a stoppinq bar to set the position of the front edge of the sheet material a on the table 211*a* when the sheet material a is passed on to the table 211*a*. This stopping bar 213 can be moved vertically in the direction of an arrow X7 by cylinders 212. The cylinders 212 are attached to a frame 214. In order to perform the positioning in the direction of the width (transversal direction) of the sheet material a that is passed to the table 211*a*, transversally adjusting bars 217*a* and 217*b* are also installed. These are transversally moved by cylinders 218*a* and 218*b*, respectively, in the direction of an arrow X8[1]. With this mechanism, the transversal alignment of the sheet material a that is placed on the table 211*a* can be carried out.

The slide table 211 has some apertures 225 of 2 to 3 mm in diameter. Air can be sucked and exhausted through these apertures 225. Thus, it is possible to fix or release a sheet material a on the table 211.

A lifting mechanism 227 is installed in the punching device 210. The lifting mechanism 227 pushes up the slide table carrying a sheet material a in the location of 211*b*. The punching device 210 is provided with Thomson blades e in the location and configuration indicated by a numeral 216, as shown in FIGS. 7A and 8B. Furthermore, it is provided with a pressing member f to form a groove (folding score) *b* in the location of 226. The punching operation is carried out by lifting the slide table 211*b* carrying the sheet material a with the lifting mechanism 227 and by pressing the sheet material a to the Thomson blades e and the pressing member f.

It is possible to move the table 211 to the location indicated by a numeral 211*c*. The numeral 220 denotes a sucking device which sucks the sheet pallet P on the table 211*c*, after the punching. As indicated by an arrow X9, the sucking device 220 can be moved vertically by a cylinder 221. This cylinder 221 is attached to a moving mechanism 222 so as to be shifted back and forth as indicated by an arrow X10. The numerals 223 and 224 denote conveyor mechanisms to pay out sheet pallets P after the punching.

Figure 8A:
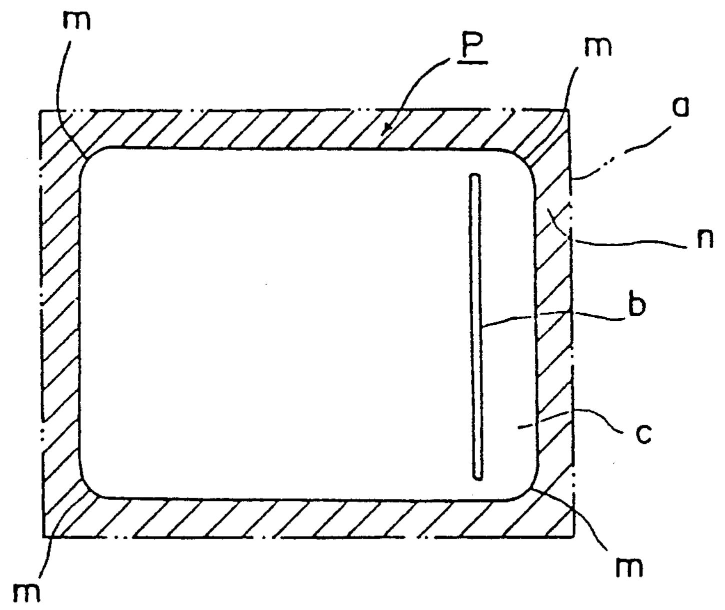
FIG. 8A is a plan view of a sheet pallet which was made by punching a sheet material with a punching device.
Figure 8B:
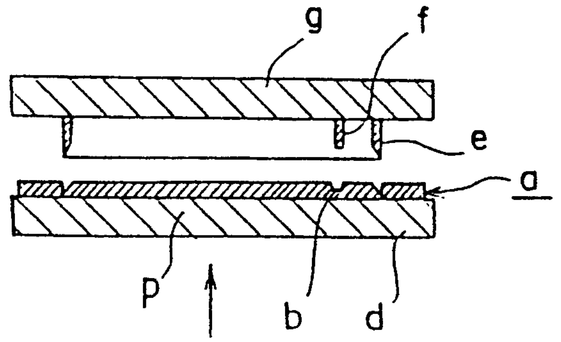
FIG. 8B is a partial cross-sectional view of a blade portion of the punching device.

The sheet pallet P formed by punching a sheet material a with the punching mechanism 210, has rounded corners as shown in FIG. 8A. A groove (score) *b* for folding is formed in parallel with one side edge of the sheet pallet P. The terminal end of this groove b is, for example, 1 cm inside from a side edge of the sheet pallet P by pressing the pressing member f which is shorter than the width of the sheet pallet P. When the length of the groove b is varied, the pressing member f is interchanged. The strength of the sheet pallet P is not lowered because the groove b is formed by pressing. A final product of sheet pallet P is obtained by folding the peripheral portion outside the groove b to form a tab portion c in a folding step (described later) next to the punching step.

FIG. 8B is a partial cross-sectional view of the blade portion of the punching device 210. The sheet pallet P is formed by punching with the punching mechanism, which comprises a flat table d (a lower die corresponding to the slide table 211) and an upper die g having a rectangular cutting blade e in the form of the external shape of the sheet pallet P and a pressing member f for forming the groove b.

Figure 9A:
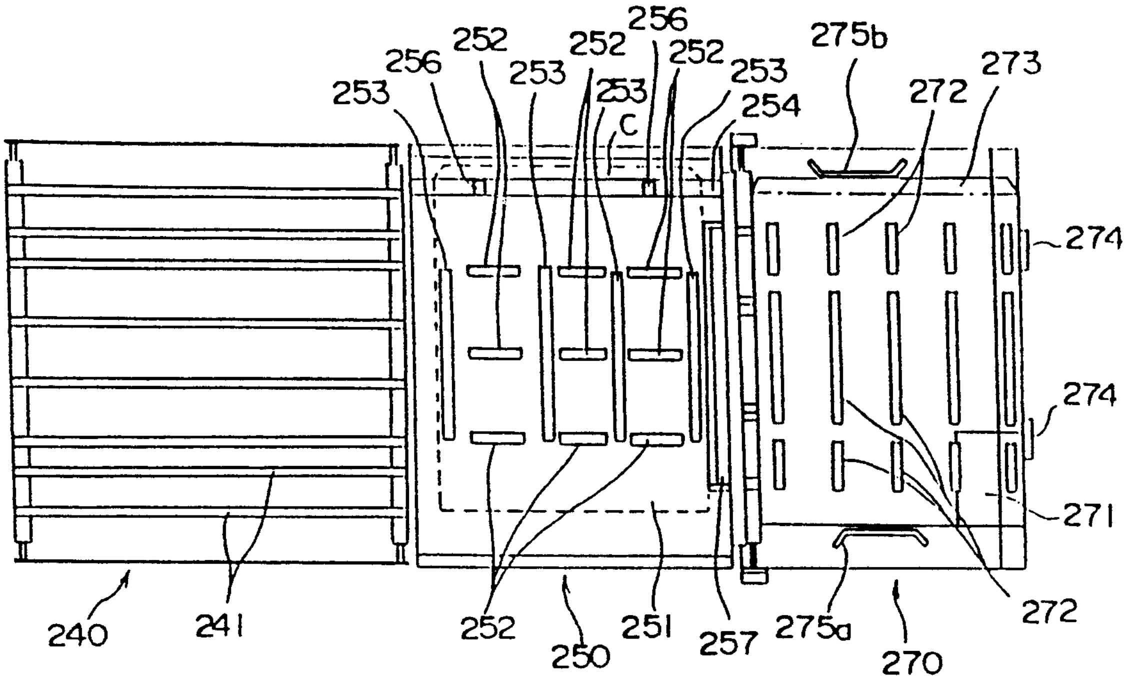
FIGS. 9A and 9B are a plan view and a side view of a folding device (tab portion forming device) and tables placed on its front side and rear side.
Figure 9B:
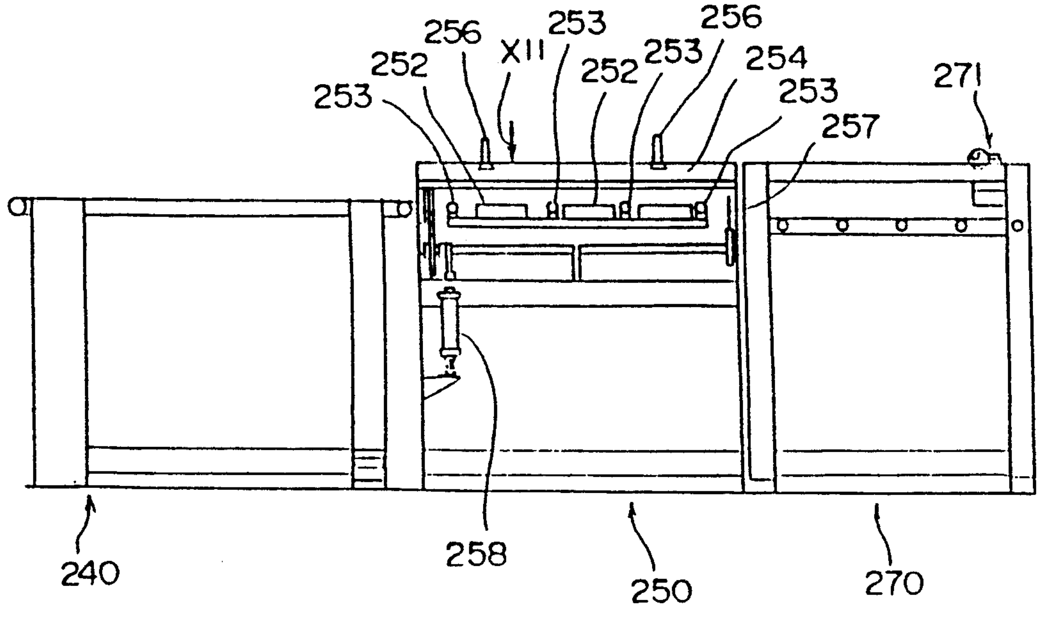

As shown in FIGS. 9A and 9B, the foregoing removing table 240 is provided with a plurality of conveyor belts 241. The cut pieces of the sheet material a (including a sheet pallet P and a peripheral waste piece n) from the punching device 210 are received by this removing table 240 with the conveyor belts 241. The peripheral waste piece n (the hatched portion in FIG. 8A) is removed on this removing table 240. After that, the sheet pallet P is introduced into the folding device 250 from the removing table 240 by means of the conveyor belts 241.

The folding device 250 is provided with a stopper member 257 which stops the front edge portion of the introduced sheet pallet P for positioning. The stopper member 257 is moved vertically by cylinders 258. When the stopper member 257 is at a raised position, the introduced sheet pallet P runs against this stopper member 257 to be positioned correctly. When the stopper member 257 is at a lower position, the sheet pallet P (having a tab portion c) is shifted to the next folding device 250 passing over this stopper member 257.

Conveyor rollers 253 are installed for moving the sheet pallet P in the directions of back and forth (in the running direction of sheet pallet P). The transversal movement of the sheet pallet P is carried out by conveyor rollers 252.

The sheet pallet P that is introduced into the folding device 250, is moved transversely (upwards in FIG. 9A) by the rollers 252 to a position 251 in FIG. 9A. The movement of the sheet pallet P in the direction of an arrow X11 (vertical) is suppressed by sheet pallet pushing members 254. The sheet pallet P is placed in the location 251 of FIG. 9A and the pushing member 254 is moved down to press the sheet pallet P, and then the tab portion c is folded.

After the folding operation, the sheet pallet P is transversely moved by rollers 252 to a position from where the sheet pallet P can be paid out.

A stacking table 270 receives a plurality of sheet pallets P put in layers with orienting tab portions c in the same direction and it passes the sheet pallets P to the next stacking device 280. The stacking table is provided with a stopper members 274 to perform positioning by stopping the front edge of received sheet pallet P. The stopper members 274 are vertically moved by cylinders (not shown). When the stopper members 274 are in a raised position, the introduced sheet pallet P dashes against the stopper members 274 to attain the positioning. When the stopper members 274 is in a descended position, the sheet pallet P is shifted to the next stage passing over the stopper members. The stacking table 270 has positioning members **275*a* and 275*b* to align the right and left side edges of sheet pallets P. When a sheet pallet P is introduced into the stacking table 270, the sheet pallet P is placed in the position indicated by a numeral 273 because it is guided by these positioning members 275*a* and 275*b***.

The stacking table 270 is further provided with a labeling device 271 and transferring conveyor rolls 272. When a sheet pallet P is introduced into the position of numeral 273 of the stacking table 270 from the folding device 250, a label is applied to the surface of the sheet pallet P by the labeling device 271.

Figure 10A:
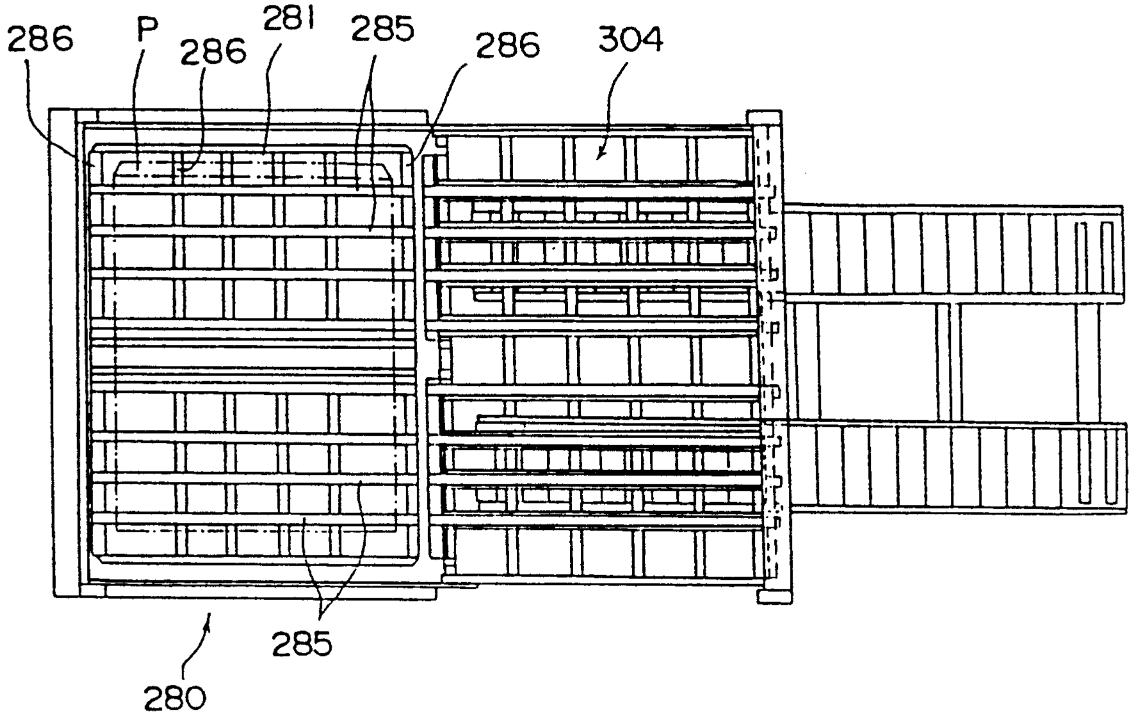
FIGS. 10A and 10B are a plan view and a side view of a stacking device.
Figure 10B:
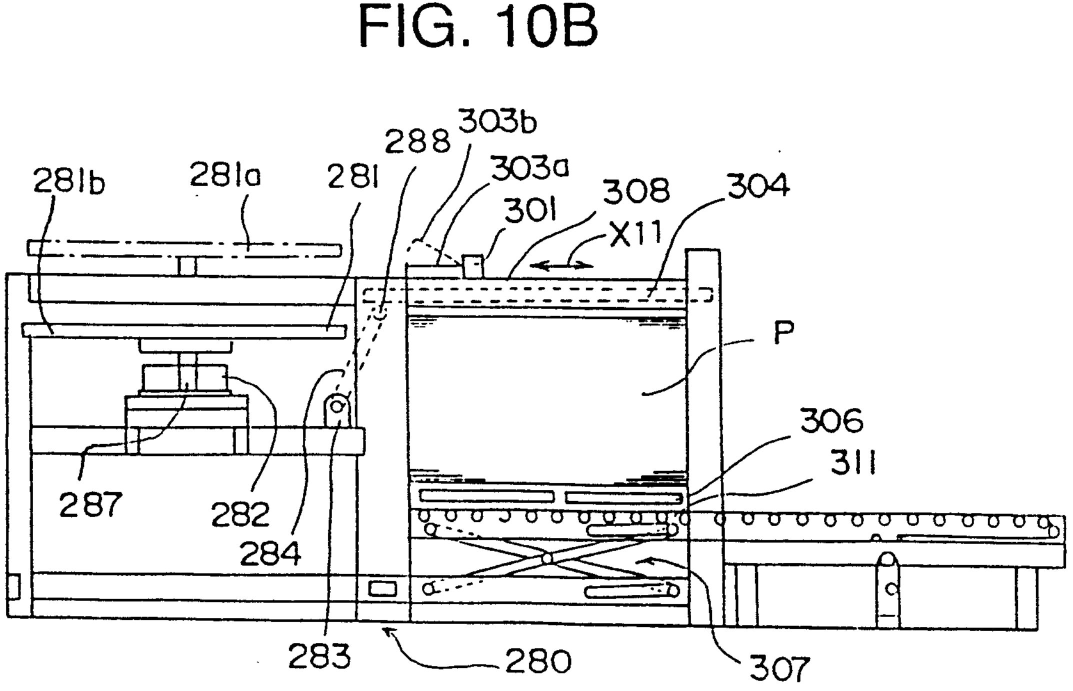

As shown in FIGS. 10A and 10B, the foregoing stacking device 280 have a table 281 which receives a plurality of sheet pallets P transferred from the stacking table 270. The table 281 is possible to move vertically to the position indicated by a numeral **281*a* by means of a driving mechanism 282. In addition, the table 281 in a position of numeral 281*a* can be turned by 180° by means of the driving device 282. The table 281 is provided with transferring conveyor belts 285 and rollers 286. P′ (FIGS. 12A to 12E) denotes a plurality of sheet pallets P held on the table 281**.

Furthermore, the stacking device 280 is provided with a pantograph-type link mechanism 307 and a stacking base 311, which base is moved vertically by the link mechanism 307. On this stacking base 311 is previously placed a wooden pallet 306 and the sheet pallets P are put on the wooden pallet 306.

A table 304 is movable in the direction of an arrow X11. When the table 281 is on a level **281*b*, the table 304 can be moved right above the table 281. The numeral 283 denotes a motor for moving; 284, a belt; and 288, a pinion for moving the table 304**.

Figure 11A:
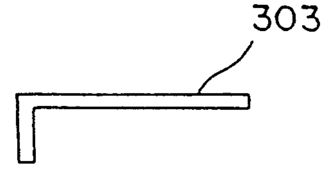
FIGS. 11A, 11B and 11C are a side view, a plan view and a perspective view of an L-shaped member of the stacking device.
Figure 11B:
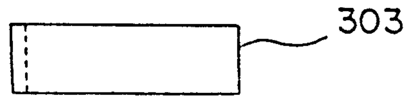
Figure 11C:
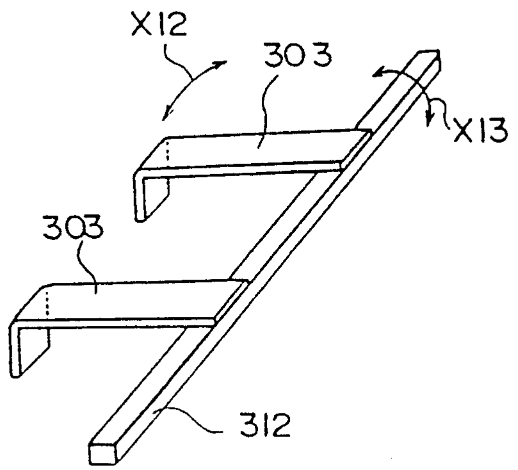

The stacking device 280 has L-shaped members 303 for putting the sheet pallet P on the table 304 on the already stacked sheet pallets P and a driving mechanism 301 to move vertically these L-shaped members 303. The driving mechanism 301 is attached to a frame 308. FIG. 11A shows a side view of the L-shaped member 303 and FIG. 11B is a plan view of the L-shaped member 303. The L-shaped members 303 are used by being fixed to a square rod 312 as shown in FIG. 11C. The L-shaped members 303 are swung up and down by turning the square rod 312 in the directions of an arrow X13 by means of the driving mechanism 301. The numeral **303*a* in FIG. 10B indicates the lower position of the L-shaped member 303 and the numeral 303*b*, the upper position of the member 303**, respectively.

In the following, the process for manufacturing sheet pallets P using the above-described apparatus is described.

Pellets of synthetic resin are fed into the hopper 101 of an extruder 102 in the web feeding device 100. The pellets of a thermoplastic resin such as polypropylene resin are used as the synthetic resin pellets. The resin is melted by being heated to 200° to 240° C. in this extruder 102. A flat sheet of molten resin of 0.5 to 3.0 mm in thickness is extruded from the T-die 103 attached to the front face of the extruder 102.

The extruded resin sheet is then passed through rolls 105 and 106 which are adjusted to 80° to 100° C. The roll 105 has a specular surface and the roll 106 has an embossed surface, thus the web S of molten resin sheet is provided with an embossed front surface and a specular rear surface. This web S is then passed over a roll 107 and under an annealing roll 108. The annealing roll 108 is preheated to remove the strain in the web S. The web S passed under the annealing roll 108 is then passed over a roll 109 and under a cooling roll 110 to be solidified.

The web S passed under the cooling roll 110 is shifted over the rolls 111 to 115 in the guide roll section 118. During this the web is further cooled by air.

The pulling device 120 pulls the web S under a predetermined tension by rolls 126 and 127 through free s supporting rolls 121 and 122. During this process, the web S is brought into close contact with the respective rolls. The web S passed through the rolls 121 and 122 is trimmed in its both side edges by the rotary blades of pairs of shear cutters **124*a*, 125*a* and 124*b*, 125*b*, to cut off uneven portions on both sides with attaining the sizing of the web in the transversal direction. The cutoff portions 129*a* and 129*b* are passed through rolls 126 and 127 and then passed under the bar member 130 and through the arm portion of the members 130***a* and 130*b*, then they are finally transferred to a crusher (not shown) to be crushed.

The web S passed through rollers 126 and 127 is then transferred to the cutting device 150 through the slackening zone 140. In the cutting device 150, the contact sensor 160 detects the top end portion 159 of the web S which is passed through the feed rollers 151 and 152. When the top end 159 of the web S is brought into contact with the contact sensor 160, the detect and control circuit 164 transmits a stop signal for driving to the driving means 153 which drives the feed roller 151. And then it transmits a signal to the driving devices 157*a* and 157*b* for the upper cutting blade 155 so as to move down the upper cutting blade 155. By this operation, the rotation of the feed roller 151 is stopped and the movement of the web S in the cutting device 150 is stopped. The web S is cut by the upper blades 155 and 156 at a predetermined length to form sheet materials a. These sheet materials a are transferred to the sheet material stacking device 170 by the conveyor mechanism 162 and 163.

When the running of the web S is stopped in the cutting device 150, the web continuously fed from the preceding pulling device 120 is slackened in the slackening zone 140. When the sheet material a is transferred, the web S is not brought into contact with the contact sensor 160, so that the driving of feed rollers 151 and 152 is started again. The web S is stretched and passed forward and thus the temporary slackening of the web S in the slackening zone 140 is eliminated and the web S becomes in a stretched condition.

The sheet material a passed from the conveyor mechanisms 162 and 163 is put in the stacking device 170. In the stacking device, the height to receive a next supply of a sheet material a (the upper most surface of sheet materials a when some sheet materials are already stacked) is adjusted such that it is a little lower than the level on which the next sheet material a is supplied from the conveyor mechanisms 162 and 163, by the pantograph-type link mechanism. The front edge of sheet material a runs against the stopper member 176 with inertia and it is put in layers by the transversely positioning members 174*a* and 174*b*. Accordingly, the sheet materials a are stacked rightly without divergence.

The sheet materials a carried on a wooden pallet 172 are put on the conveyor rolls of the sheet feeding device 180 shown in FIG. 2 and they are transferred by the rotation of rolls to the predetermined position as shown in FIGS. 6A and 6B, which are fixed by an appropriate fixing means.

The sheet feeding means 180 sucks an uppermost sheet material a with lowering the suction mechanisms 188 and 189 by a cylinder 184. After that, the suction mechanisms 188 and 189 are lifted up by the cylinder 184 and shifted forward. By this operation, the front end of the sheet material a is pinched by rolls 190 and 191. The suction of the suction mechanisms 188 and 189 are released here. The sheet material a pinched between the rolls 190 and 191 is then paid out from the sheet feeding device 180 and transferred by the conveyor belts 196.

The sensor 198 detects the front end of the sheet material a carried on the conveyor belts 196. The detecting state of the sensor 198 is maintained while the sheet material a is waiting on the conveyor belts 196. In this state, the conveyor belts 196 are not driven and the sheet material a is not transferred to the next punching device 210. The conveyor belts 196 are driven by the indication of the punching device 210 and the sheet material a is transferred to the punching device 210.

When the sheet material a on the conveyor belts 196 is transferred to the punching device 210, the slide table 211 is set in the position of a numeral 211*a* in FIGS. 7A and 7B. The front end of the sheet material a transferred from the conveyor belts 196 is brought into contact with a stopping bar 213. In this operation, the stopping bar 213 is brought down by cylinders 212 to come into contact with the table 211*a*. Cylinders 218*a* and 218*b* are then actuated and transversely adjusting bars 217*a* and 217*b* are brought into contact with the sheet material a on the table 211*a* to carry out the transversal alignment. The sheet material a is then sucked and fixed by the suction from apertures 225 in the slide table by the action of a vacuum pump.

In the next step, the slide table is moved to the center position 211*b* in the punching section. The slide table is lifted up by driving a pressing device to obtain a sheet pallet P by pressing the forming blade 216 on the upper plate to the sheet material a placed on the slide table 211*b*. At the same time, a groove is formed at a position indicated by a numeral 226 in FIG. 7A.

After the punching of the sheet pallet P, the slide table is shifted to the downstream position 211*c* in order to discharge the sheet pallet P. In this step, air is blown from the apertures 225 of the slide table by the reverse action of the vacuum pump to release the punched sheet pallet P from the slide table. The cylinders 221 are then actuated to move down the suction mechanism 220 and the punched sheet pallet P on the slide table 211*c* is sucked. The suction mechanism 220 is then lifted by cylinders 221 to raise the sucked sheet pallet P. The end portion of the sheet pallet P is moved to the conveyor 224 by a driving mechanism 222 and the suction of the suction mechanism 220 is released. The sheet pallet P on the slide table 211*c* is transferred by the conveyor belts 224. The empty slide table 211 is returned to the position 211*a* and the treatment of a next sheet material a is done. Incidentally, when the sheet pallet P cannot reach the stopping bar 213 by the conveyor of the sheet feeding device 180 due to its thickness or bending, controlled air is blown from the apertures 225 of the slide table.

The punched sheet that is transferred by the conveyor belts 224 from the punching device 210 is once stopped on the conveyor belts 224. The portion n around the sheet pallet P which portion n is not a product is removed here. After that, the conveyor belts 224 are driven again to transfer the sheet pallet P to the folding device 250.

In this phase, the stopper 257 is raised by a cylinder 258. The sheet pallet P introduced into the folding device 250 by the conveyor belts 241 is brought into contact with a stopper 257 to attain the positioning. The sheet pallet P is then shifted to the position 251 in FIG. 9A by conveyor rolls 252. By using cylinders 256, the pushing member 254 is moved down by the cylinders 256 to be pressed to the sheet pallet P to fold the tab portion c.

After the folding operation, the sheet pallet P is moved transversely by rollers 252 so as to be transferred. The sheet pallet P is then transferred from the folding device 250 to the stacking table 270 by driving rollers 253.

In this step, the stopper 274 is lifted up. The sheet pallet P on the stacking table 270 is guided by the positioning members 275*a* and 275*b* on both sides and it is brought into contact with the stopper 274, accordingly, the sheet pallet P is located at the numeral 273 in FIG. 9A. A label is applied to the sheet pallet P by the labeling device 271.

With maintaining the stopper 274 at the upper level, a predetermined number (about 20) of sheet pallets P are led to the stacking table 270. The sheet pallets P of a certain number are thus stacked on the stacking table 270 with the tab portions c aligning on the same side.

The stopper 274 is moved down and a predetermined number of sheet pallets P are transferred to the table 281 of the stacking device 280 by driving the conveyor rolls 272. In this step, the table 281 is set at the position of a numeral 281*b* in FIG. 10B. In other words, the upper surface of the table 281 is on the same level as the upper surface of the stacking table 270.

The mode to stack a plurality of the sheet pallets P put on the table 281 is described with reference to FIGS. 12A to 12F. FIGS. 12A to 12F are schematic illustrations showing only the main members such as the table 281 of the stacking device 280 and the L-shaped members.

Figure 12A:
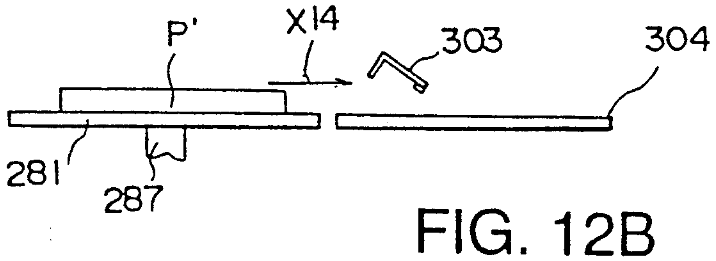
FIGS. 12A to 12F are schematic illustrations showing only the main parts such as a table and an L-shaped member of the stacking device.

In the first place, the table 281 is moved to the same level as the table 304 by lifting the table 281 with the driving mechanism 282, as shown in FIG. 12A. A plurality of sheet pallets P on the table 281 are transferred to the table 304 in the direction of an arrow X14. In this step, the L-shaped member 303 is lifted up. By this operation, the state shown in FIG. 12B is attained.

Figure 12B:
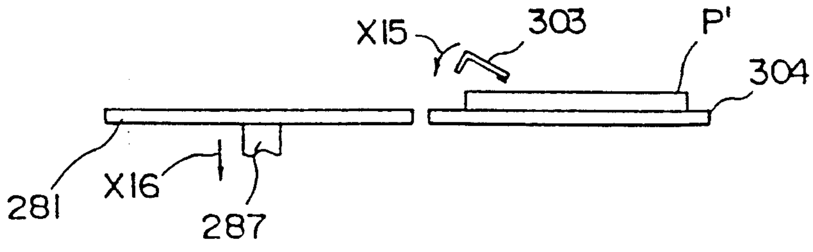
Figure 12C:
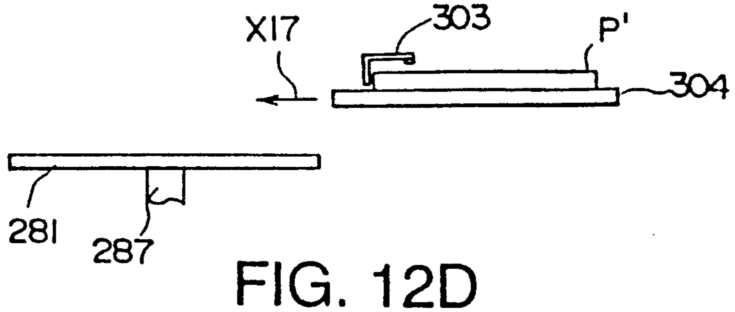

The table 281 is moved down in the direction of an arrow X16 from the state of FIG. 12B and the L-shaped member 303 is moved down in the direction of an arrow X15 to become the state as shown in FIG. 12C.

Figure 12D:
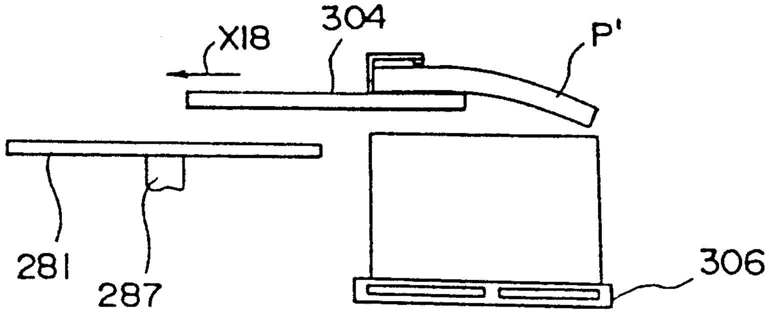

The table 304 is moved in the direction of an arrow X17 from the state of FIG. 12C. The intermediate state of the movement is shown in FIG. 12D. Because the L-shaped member 303 is moved down, only the table 304 is shifted in the direction of an arrow X18 with leaving the plurality of sheet pallets P'.

Figure 12E:
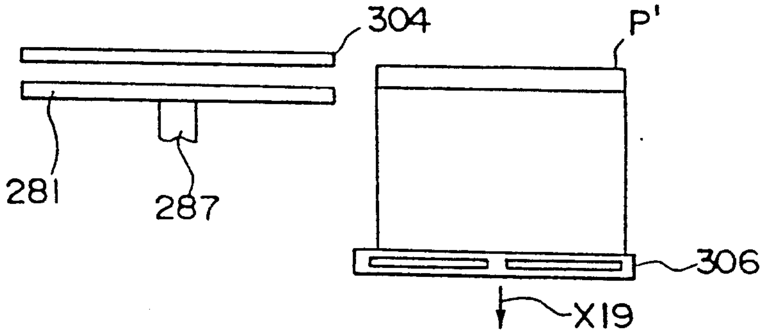
Figure 12F:
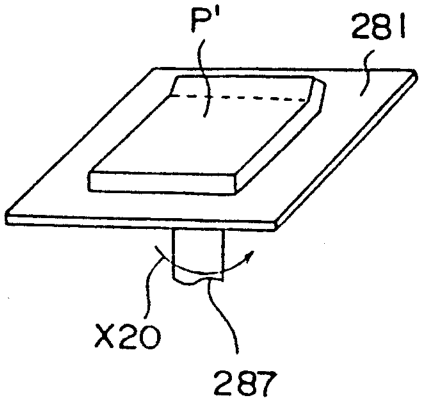

The state of FIG. 12E is obtained after the movement of the table 304. By this operation, a plurality of sheet pallets P' can be placed on the already stacked sheet pallets P.

In the above operation, the sheet pallets P' are stacked with maintaining their orientation. Meanwhile, the tab portions c can be disposed on the opposite side by turning the table 304 by 180°. Provided that the state just after the transferring of a plurality of sheet pallets P to the table 281 by driving the conveyor rolls 272 is that of FIG. 12F, in which the tab portion c is on the far side. The table 281 is lifted to the position of the numeral 281*a* and it is turned by 180° in the direction of an arrow X20 around the axis 287. The tab portion c is positioned on this side. When the table is lowered in this state and the procedures are carried out from FIG. 12A in order, the sheet pallet P' can be stacked with the tab portions c on this side.

Figure 13:
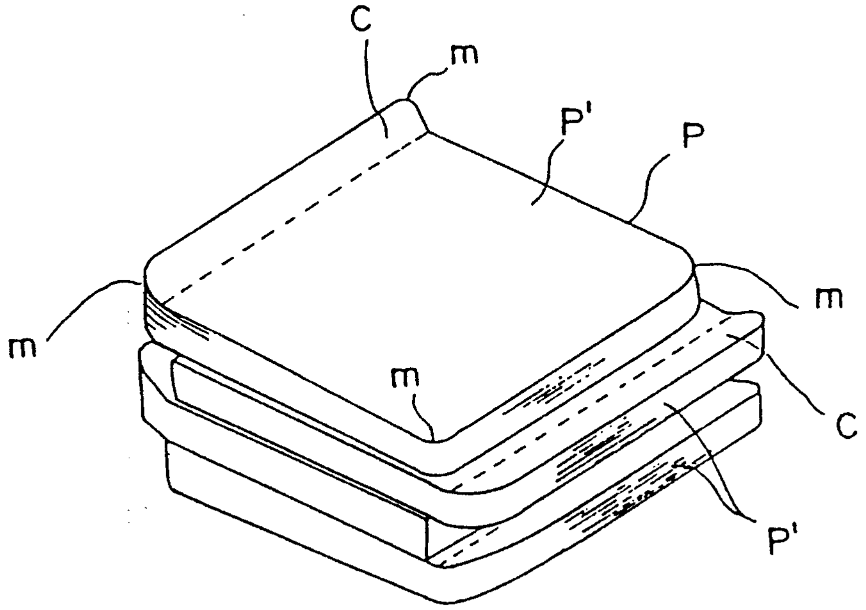

By the above operation, it is possible to stack a plurality of sheet pallets P with their tab portions c on the other side together with a plurality of sheet pallets P with their tab portions c on this side, by turns. FIG. 13 shows the external view of the thus stacked state. A plurality of sheet pallets P are stacked with their tab portions c in the same direction and the groups of pallets P' are stacked with their tab portions c in the alternate directions. By the stacking with alternately disposed tab portions c, the flattening of folded tab portions c can be avoided.

According to the above first embodiment, it is possible to automate the process because almost the all steps were made continuous as the so-called one line process. Therefore, the productivity can be improved as compared with the conventional processes and sheet pallets P of various sizes can be made without difficulty by small labor cost.

Because the process to form and store the sheet material a was separated from the process to form sheet pallets P from the sheet material a, when the speed to form the sheet material a and the speed to form the sheet pallets P from the sheet material a are different, the time of waiting in a production line can be reduced to enhance the production efficiency.

Furthermore, it is possible to produce sheet pallets P having embossed front surfaces and specular rear surfaces. By providing the embossed front surface, the friction between goods to be carried and the sheet pallet P can be increased. By providing the specular rear surface, the friction of the sheet pallet P when it is pulled on the platens of a forklift truck, can be reduced. The patterns for embossing are arbitrarily selected.

Still further, because the annealing roll is provided, the strain in the sheet pallets P is reduced.

In the following, a second embodiment of the present invention will be described with reference to FIG. 14.

Figure 14:
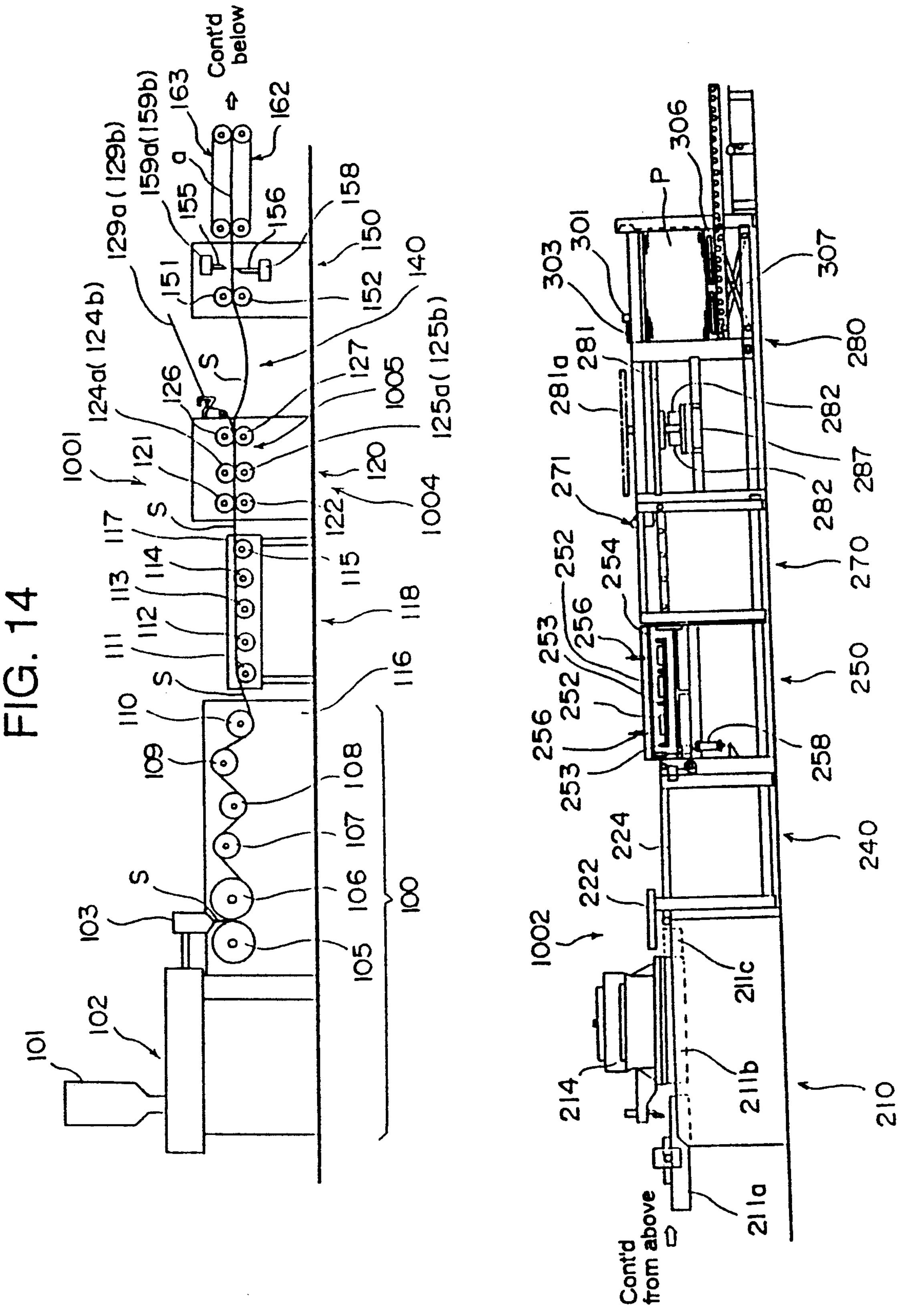
FIG. 14 is a schematic side view of a second embodiment of the present invention.

Incidentally, the same reference numerals in FIG. 14 as those of FIGS. 1 and 2 indicate the same parts and members.

As shown in FIG. 14, in the feeding device 1001 of this second embodiment, the sheet material a fed from a web cutting device 150 is directly fed to the punching device 210 of a forming device 1002. According to such a constitution, it is possible to automate the whole process into one line and labor cost can be reduced.

In the following, a third embodiment of the present invention will be described with reference to FIGS. 15 and 16.

Figure 15:
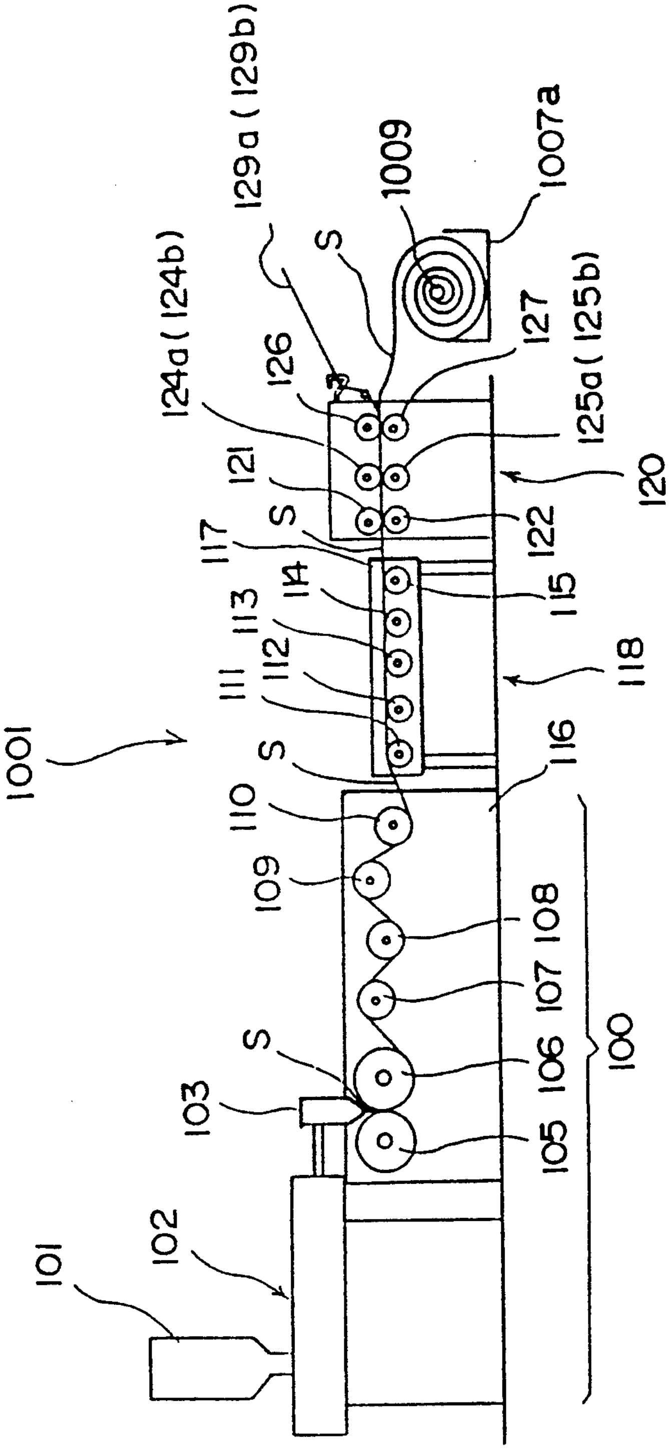
FIGS. 15 and 16 are schematic side views of a third embodiment of the present invention.
Figure 16:
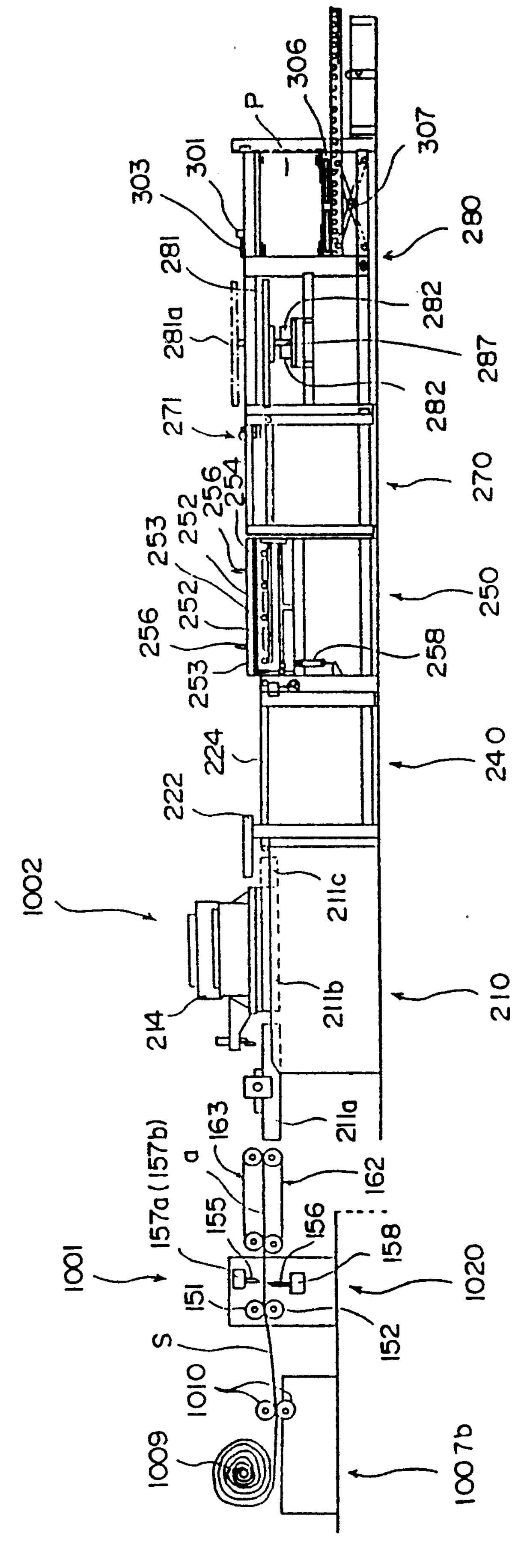

As shown in FIGS. 15 and 16, the feeding device 1001 in this third embodiment has a web winding device 1007*a* and a rolled web feeding device (web feeding device) 1007*b*. In the web winding device 1007*a*, the web S both sides of which are trimmed by shear cutters 124*a*, 125*a* and 124*b*, 125*b*, is wound to a core 1009. The rolled web feeding device 1007*b* feeds the rolled web S that is wound by the web winding device 1007*a*, by feeding rolls 1010 to a web cutting device (third cutting means) 1020, which device 1020 has similar structures as those of the web cutting device 150 in the first embodiment.

Almost all the steps can be carried out continuously by this constitution, so that the process can totally be automated and the labor cost can be reduced.

The punching device used in the above embodiment punches sheet pallets P with a rectangular frame as shown in FIGS. 8A and 8B, however, it is not limited to the rectangular frame but it may be the one with which only four corner portions m are cut off in an arcuate form. By such a structure, useless waste portions can be reduced. Especially when only the four corner portions m are cut off, if the corner portions m on the downstream sides of a preceding sheet material a and the corner portions m on the upstream sides of a succeeding sheet material a are cut off simultaneously, the yield is raised and production cost is reduced.

An exemplar punching device like this is described in the following with reference to FIGS. 17 to 21.

Figure 17:
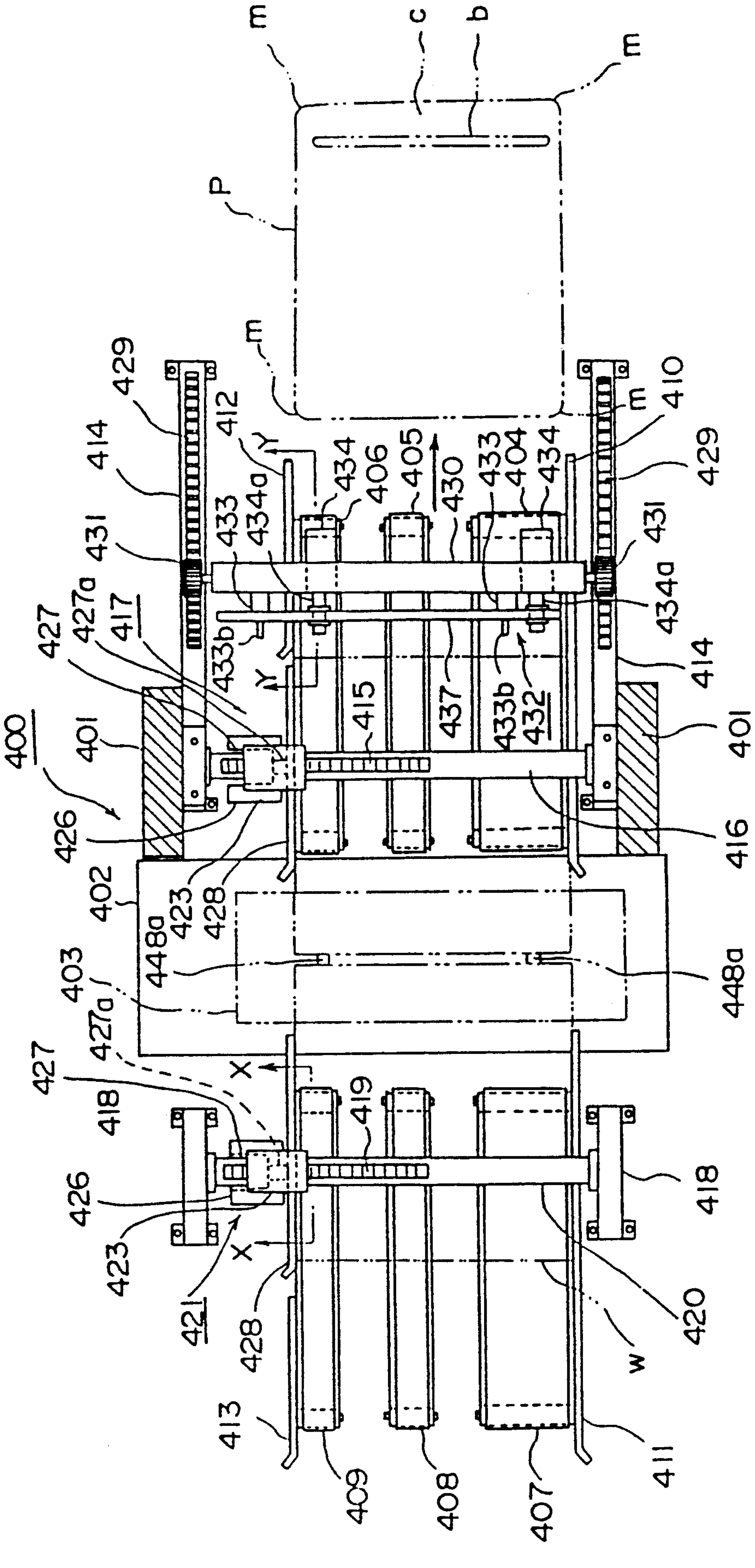
Figure 18:
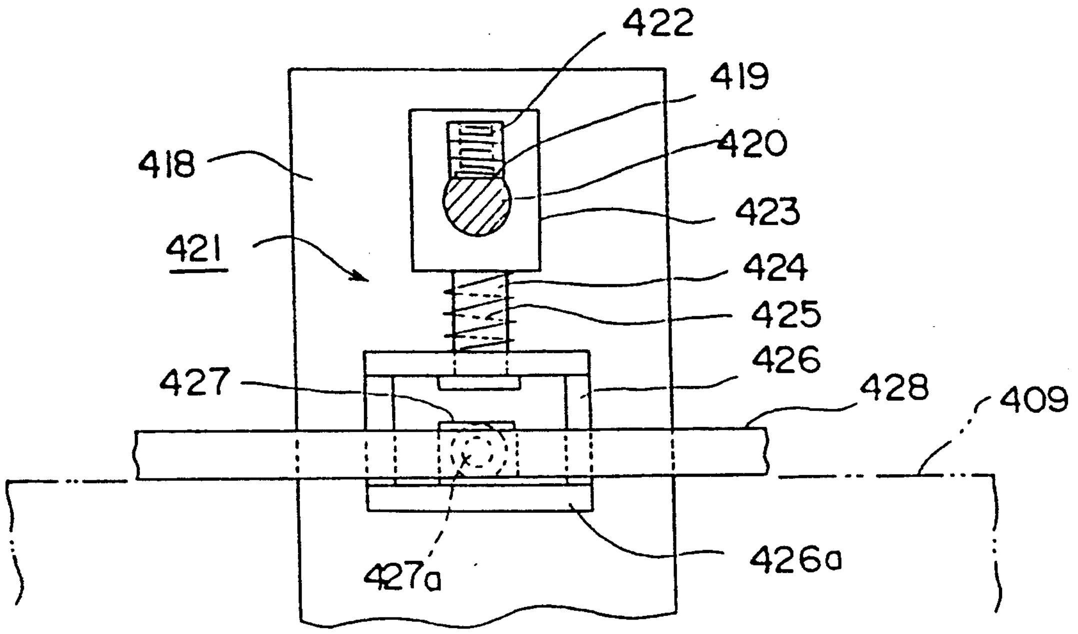
Figure 19:
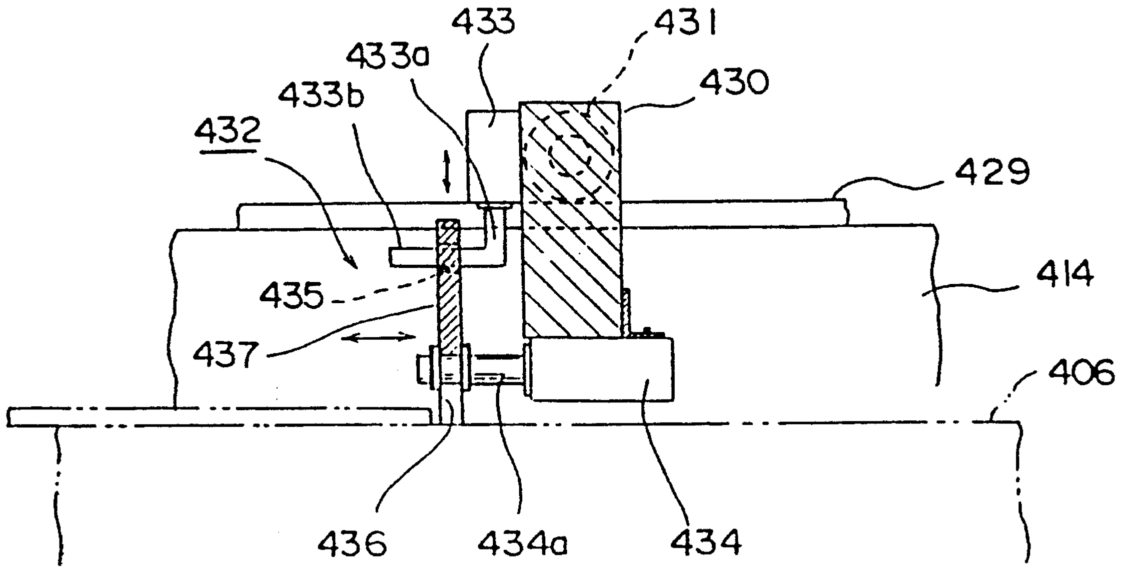

In FIG. 17, the reference numeral 401 is a frame of a pressing device 400 and 402 is a table. A pair of upper and lower dies 403 is placed on the table 402, which dies are described later in detail.

In the front side and rear side (right and left in FIG. 17) of the table 402 are respectively installed three belt conveyors 404, 405 and 406 for discharging a sheet material a and belt conveyors 407, 408 and 409 for feeding a sheet material a. The upper surfaces of these belt conveyors are almost on the same level as the working level of the die 403.

Among these conveyors, narrower conveyors 405, 406, 408 and 409 can be moved transversely in compliance with the size of sheet materials a.

Reference numerals 410 and 411 denote fixed longitudinal guides to limit the transversal movement of sheet materials a. They are fixed to left side frames of the wider belt conveyors 404 and 407 with their upper ends being a little protruded above the upper surfaces of the belt conveyors 404 and 407.

Guides 412 and 413 form pairs respectively with the above fixed guides 410 and 411, to guide a sheet material a before and after processing. They are attached to the front end and the rear end of right side frames of the front and rear belt conveyors 406 and 409 that are installed at right side ends.

If the width of sheet materials a is smaller than the range in which the belt conveyors 406 and 409 are moved and the guiding with the guides 412 and 413 is impossible, similar detachable guides (not shown) may be fixed to the right side frames of belt conveyors 405 and 408, or they may be attached to be moved vertically.

The numeral 414 denotes a pair of right and left long bases which stand inside the frame 401 on the floor. A guide shaft 416 is attached between the rear ends of them and is provided with a rack 415 of a predetermined length and a first positioning device 417 which is movable in the directions of right and left.

A pair of right and left bases 418 which are installed upright on the floor of the rear side of the table 402 and the front side of the sheet feeding belt conveyors 407, 408 and 409, are provided with a guiding shaft 420 having a rack 419 of a desired length on the upper flat surface thereof. This guiding shaft 420 is provided with a transversely movable second positioning device 421 having a structure similar to that of the first positioning device 17.

As shown in FIG. 17, the above second positioning device 421 comprises a sliding member 423 being slidably attached to the guiding shaft 420 and having a pinion 422 which engages with a rack 419, a vertical supporting shaft 424 which supports the lower face of the sliding member 423, a compression coil spring 425 fitted around the supporting shaft 424, a rectangular supporting frame 426 which is vertically slidably suspended by the supporting shaft 424, an air cylinder 427 which is placed on the bottom piece 426*a* of the supporting frame 426, and a movable guide 428 of a desired length. The movable guide 428 is parallel to the foregoing fixed guide 411 and the middle portion is attached to the end of a piston rod 427*a*, thereby moving relative to the fixed guide 411 above the belt conveyors 408 and 409.

The above movable guide 428 and the fixed guide 411 in a pair push both side faces of the sheet material W in a fixed state. When the width of the sheet member a is varied, the sliding member 423 is moved transversely along the guiding shaft 420 and the relative width between the fixed guide 411 and movable guide 428 can be adjusted.

In the above movement, when the supporting frame 426 and the movable guide 428 fitted thereto are moved over the belt conveyors 409 or 408, the whole body of the supporting frame 426 is lifted up against the force of the compression coil spring 425.

Incidentally, because the first positioning device 417 is of the same constitution as that of the above second positioning device 421 and has the same function, same members are assigned with the same reference numerals while detailed description is omitted.

A rack 429 is formed from the middle to the front end portion of the upper surface of each base 414. Both racks 429 mesh with pinions 431 which are secured to both ends of the supporting member 430 that is bridged between the bases 414.

The supporting member 430 is provided with a push-back device 432 for pushing back the sheet materials a which are fed by the belt conveyors 404, 405 and 406 for discharging sheet materials.

As shown in FIG. 17, the push-back device 432 comprises a pair of right and left lifting air cylinders 433, a pair of right and left push-back air cylinders 434 and a gate plate 437. The lifting air cylinder 433 is attached to the upper rear side of the supporting member 430 and is provided with a piston rod 433*a* which extends downward and a lifting rod 433*b* which extends backward from the end of the piston rod 433*a*. The push-back air cylinder 434 is attached to the bottom surface of the supporting member 430 and is provided with a piston rod 434*a* which extends backward. The gate plate 437 is held in parallel with the supporting member 430 and the above lifting rods 433*b* are inserted through a pair of upper through holes 436 and the piston rods 434*a* of the push-back air cylinder 434 are inserted through a pair of the lower vertical slots 436.

When the lifting air cylinders 433 are actuated, the gate plate 437 can be moved from the lower limit position wherein the lower end surface is close to the upper surface of the belt conveyors 404, 405 and 406, to the upper limit position to allow the passage of the sheet material W.

In this case, because the piston rods 434*a* which engage with the vertical slots 436 of the gate plate 437 are vertically movable within the slots 436, the vertical movement of the gate plate 437 can be performed smoothly.

Meanwhile, when the push-back air cylinders 434 are actuated, the gate plate 437 can be moved back and forth above the belt conveyors 404, 405 and 406 being guided by the lifting rods 433*b*.

In the following, the die 403 is described in detail.

Figure 20:
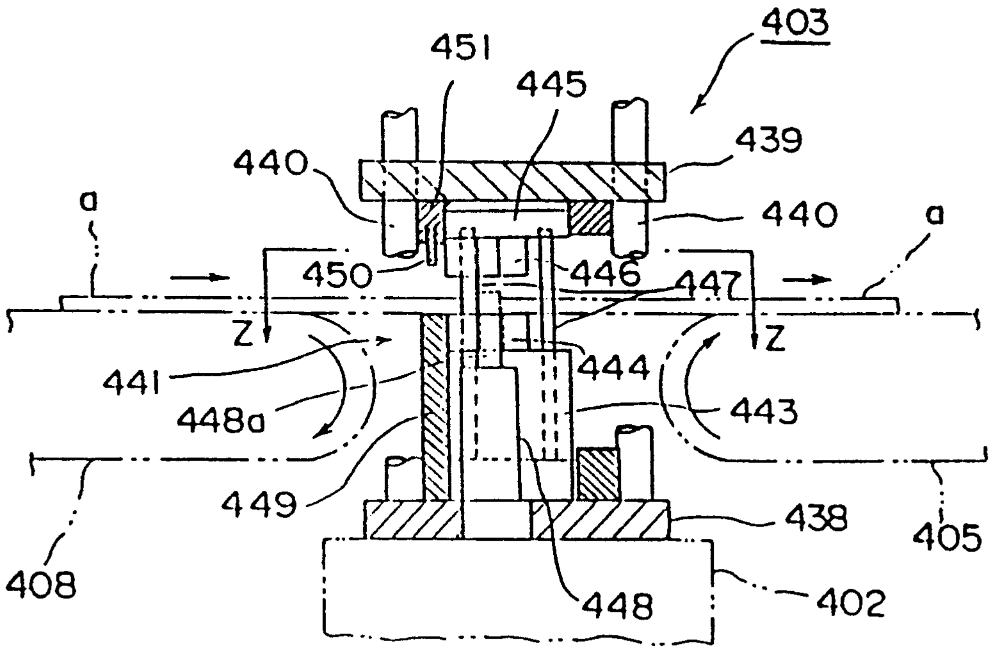
Figure 23:
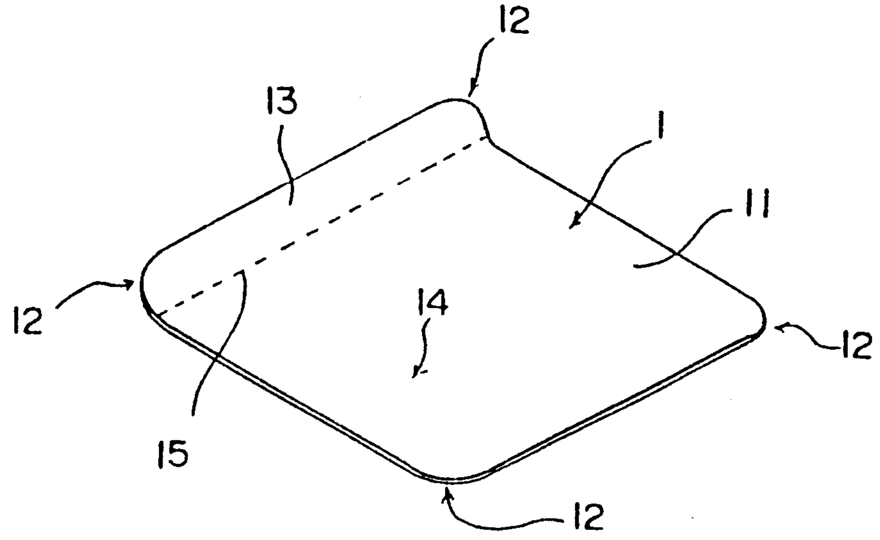
FIG. 23 PRIOR ART
FIG. 23 is a perspective view of a sheet pallet.
Figure 21:
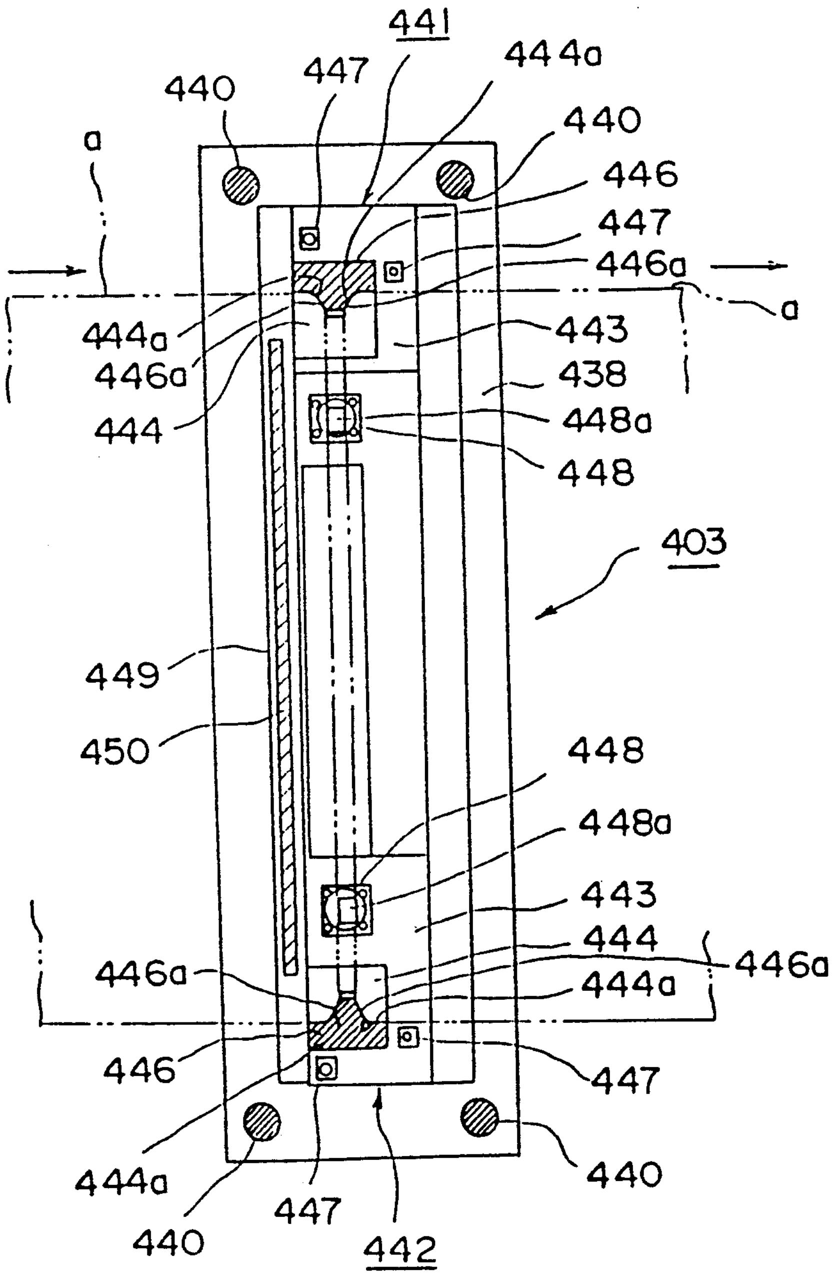

In FIGS. 20 and 21, the reference numeral 438 denotes a fixed base which is installed on the table 402 of a pressing device; 439, a movable base which is attached to a ram (not shown). Both the bases 438 and 439 are made one unit by defining their positions with four poles 440 which are set up on both right and left sides.

The reference numerals 441 and 442 denote die sets which are symmetrically installed in both the right and left end portions of the bases 438 and 439. These die sets comprise a concave lower blade 444 having arcuate cutting blade surfaces 444*a* and a convex upper blade 446 having cutting blade surfaces 446 which is brought into engagement with the above 444*a*. The lower blade 444 is attached to the upper faces of lower die holders 443 on the fixed base 438. The upper blade is attached to the under surface of upper die holders 445 which are attached to the under surface of the movable base 439.

Guide poles 447 are fitted between the upper and lower die holders 443 and 445. When the movable base 439 is pushed down by the ram, the upper die holders 443 are moved down with the guide of the guide poles 447, thereby the upper blade 446 is brought into engagement with the lower blade 444.

The die set 442 on the left side can be moved in the directions of right and left in compliance with the change of the width of the sheet material W.

A pair of retractable sheet material stoppers 448 are installed in the inside and on the center line of the lower blade 444 and the upper blade 446. When the square piston rods 448*a* as stoppers are protruded by air cylinders above the height of the lower blade 444, the front end or rear end of the sheet material a is brought into contact with them.

The sizes of the front and the rear of piston rods 448*a* are so determined that, in this step, the respective corners of a sheet material a are positioned just above both the lower blade 444 and just below the cutting blade surface 446*a* of the upper blade.

A receiving base 449 forming the same plane as that of the blade 444 is attached on the fixed base 438 in the rear part of the lower die holder 443. An upper die 451 having a pressing member (score forming means) 450 for forming a folding groove in the surface of a sheet material a is attached to the under surface of the movable base 439 which faces the receiving base 449.

In the following, the method for producing sheet pallets P from sheet materials a made of a synthetic resin by using the above punching device, is described.

The sheet materials a before the processing are rectangular ones which are previously cut in the external sizes of sheet pallets P to be produced.

In the first place before the working, the front and rear and right and left positions of guides 412 and 413, the first and the second positioning devices 417 and 421, and push back device 432 are set as shown in FIG. 17 in accordance with the width and length of sheet materials a. At the same time, the gate plate 437 of the push back device 432 is lowered and the piston rods 448*a* of the air cylinders 448 of the die set 441 are protruded.

A first sheet material a transferred from a sheet material stocker, not shown, is shifted forward by sheet material feeding belt conveyors 407, 408 and 409. When the front end of the sheet material is brought into contact with the previously protruded piston rod 448*a*, the belt conveyors 407, 408 and 409 are stopped. At the same time, the air cylinder 427 of the second positioning device 421 is actuated to set the sheet material a in a fixed state by the movable guide 428 and fixed guide 411.

In this step, as shown in FIGS. 20 and 21, both corner portions m on the front side of the sheet material a are automatically positioned between the cutting surfaces 444*a* and 446*a* on the rear sides of the respective lower blade 444 and upper blade 446.

In this state, when the ram, not shown, is actuated, both corner portions m of the sheet material a are cut arcuately by the downward movement of the upper blade 446. At the same time, a groove is formed by the pressure of the pressing member 450 in the surface of front end portion.

Simultaneously with the retracing of the movable guide 428, piston rods 448*a* are retracted to release the sheet material a, and the sheet material feeding belt conveyors 407,408 and 409 and the sheet material discharging belt conveyors 404, 405 and 406 are driven together to shift forth the sheet material a until it reaches the gate plate 437.

Incidentally, the piston rod 448*a* is protruded again just after the passage of the rear end of the sheet material a over the piston rod 448*a* so as to provide for stopping of a next sheet material a.

When the sheet material a is brought into contact with the gate plate 437, the sheet material discharging belt conveyors 404, 405 and 406 are immediately stopped and just after that, the push back air cylinders 434 on the right and left sides are actuated to move back the gate plate 437 until the rear end of the sheet material a is brought into contact with the piston rod 448*a*.

In this step, both corner portions on the rear side of the sheet material a are automatically positioned between the cutting surfaces 444*a* and 446*a* on the front sides of the respective lower blade 444 and upper blade 446 (cf. FIG. 21).

A second sheet material a fed from the sheet material stocker is transferred by the continuously driven belt conveyors 407, 408 and 409 for feeding of sheet materials in the like manner as the first sheet member a and the front end of the sheet material is brought into contact with the piston rods 448*a*, and both corner portions m in the front end are positioned between the cutting blade surfaces 444*a* and 446*a* on the rear sides of the lower blade 444 and the upper blade 446 to become a waiting state.

This process is done almost simultaneously with the pushing back of the preceding first sheet material a. At the time when both the sheet materials a are brought into contact with the piston rod 448*a*, the first and second positioning members 417 and 421 are actuated and both the sheet materials a are immovably fixed by the front and rear movable guides 428 and fixed guides 410 and 411.

In this step, the gate plate 437 is returned to the original position by the retraction of the push back air cylinder 434. After that, by the action of lifting air cylinder 433, it is lifted to the position to allow the passage of the worked sheet material a.

When the ram is actuated in this state, both corner portions m on the rear side of the preceding first sheet material a and both corner portions m on the front side of the succeeding second sheet material a are cut arcuately by the pressing with the right and left upper blades 444 and a groove is formed in the front end surface of the second sheet material a by the pressing member 450.

Both movable guides 428 of the first and the second positioning devices 417 and 421 are then returned back and piston rods 448*a* are retracted, and the front and rear belt conveyors 404, 405, 406 and 407, 408, 409 are driven to transfer the finished first sheet material a, that is a product of sheet pallet P, to a predetermined place (cf. FIG. 17) passing under the previously lifted gate plate 437.

The gate plate 437 is moved down just after the passage of the first sheet material a to block the passage of the second sheet material a which is transferred by the sheet material discharging belt conveyors 404, 405 and 406.

In this step, the third sheet material a which is sent forth by the sheet material stocker is already brought into contact with the piston rod 448*a* and being in waiting condition. In the like manner as the above procedure, the rear corner portions m of the preceding second sheet material a and the front corner portions m and the groove b of the succeeding third sheet material a are simultaneously worked.

The continuous production by punching of the sheet pallets P having arcuate corner portions and a transversal groove in the front end portion, can be carried out by repeating the above procedure.

As described above, in the above punching device, the rear side and the front side corner portions m of the preceding and succeeding two sheet materials a can be cut simultaneously and completely by the engagement of the lower blade 444 and the upper blade 446. Accordingly, the labor cost can be reduced and the productivity is improved.

Furthermore, because sheet materials which are preliminarily formed in accordance with the external sizes of sheet pallets P to be prepared can be used, the waste of material is reduced and the yield is improved to reduce the production cost.

Because the lower blade 444 and the upper blade 446 do not come into direct contact with each other, the cycle time of interchanging blades and serviceable life can be extended.

It is possible to form the groove b in the rear side portion of the sheet material a by providing the receiving base 449 and the pressing member 450 for the formation of the groove b in the surface of the sheet material a on the front side of the die set 441. Or these members may be installed on both sides to form two grooves b in front and rear portions of the sheet material a.

The configuration of cut corner portions m is not limited to the above arcuate form.

Figure 22:
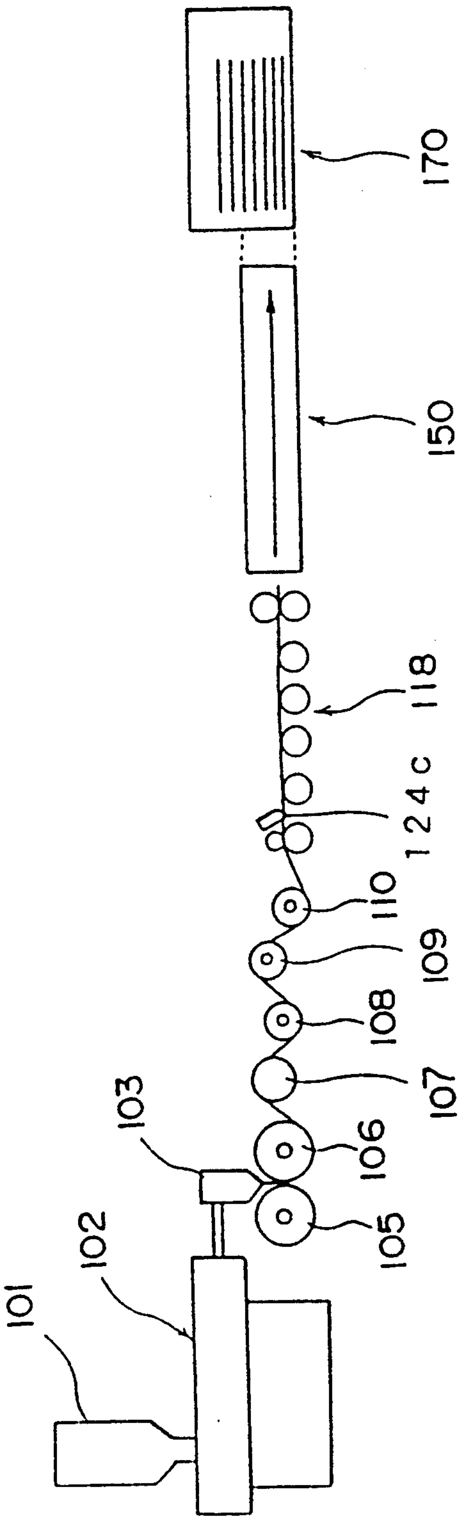
FIG. 22 is a side view of a modified embodiment in which a cutter to trim the side edge portions of web material is disposed just before a guide roll portion.

FIG. 22 shows an embodiment in which the position of the cutter to trim the both side portions of web material is varied. In the same figure, the same reference numeral shown in FIG. 22, a cutter 124c to trim the side edges of web material can be installed just before the guide roll portion 118.

In the above embodiment, the tab portion c is formed by folding one side edge in the direction of width of sheet pallet P in the transferring operation. The pallets P are stacked, one step to stack without changing the orientation of tab portions c and the other step to stack with changing the orientation of tab portions c by 180° are carried out by turns. However, the invention is not limited to this but, for example, the tab portions c are formed by folding front sides in the transferring process and, in the stacking process, one step to stack with changing the orientation of tab portions clockwise by 90° and the other step to stack with changing the orientation of tab portions counterclockwise by 90° may be carried out by turns.

Furthermore, in the above embodiments, the invention was described with the example of the apparatus for producing sheet pallets. The present invention is, however, not restricted to such an example but can be applied to the production of tier sheets. In the case of tier sheets, the score forming device and folding device can be omitted because tier sheets have no score for holding.

INDUSTRIAL APPLICABILITY

As described above, because the present invention enabled to carry out continuously a step to feed sheet materials in a predetermined shape having corner portions, the step to form the sheet materials into a desired shape by cutting at least corner portions thereof, and a step to stack these sheets, excellent advantages can be obtained in that the productivity is high, mass production is possible, and sheets of various sizes can be produced at lower labor cost without difficulty.

I claim:

1. An apparatus for manufacturing sheets, comprising a feeding means to feed sheet materials in a predetermined shape having corner portions, a processing means for cutting at least said corner portions of said sheet materials to prepare sheets in a desired shape, and a stacking means to stack the thus obtained sheets, and including (i) a first platform for receiving the prepared sheets from the processing means, (ii) a second platform, (iii) means to transfer a multitude of bundles of the prepared sheets, one bundle at a time, to the second platform from the first platform, and (iv) means to pivot each bundle of the prepared sheets to change the orientation thereof, to form a stack of prepared sheets on the second platform from a plurality of bundles of different orientations.

2. The apparatus for manufacturing sheets as claimed in claim 1, wherein said feeding means comprises a web forming device which forms a web material made of a synthetic resin and a sheet material forming device which cuts said web material into sheet materials of a predetermined shape.

3. The apparatus for manufacturing sheets as claimed in claim 1, wherein said feeding means comprises a web forming device which forms a web material made of a synthetic resin, a sheet material forming device which cuts said web material into sheet materials of a predetermined shape, a storing device which stores said sheet materials and a sheet feeding device which feeds said stored sheets to a next process.

4. The apparatus for manufacturing sheets as claimed in claim 1, wherein said feeding means comprises a web feeding device which feeds previously formed web material made of a synthetic resin in a predetermined width and a third cutting means which cuts said web material in a predetermined length.

5. The apparatus for manufacturing sheets as claimed in claim 1, wherein said feeding means comprises a web forming device which forms a web material made of a synthetic resin, a web winding device which cuts said web material in a predetermined width and wind said cut material, and a web feeding device which cuts said wound web material in a predetermined length and feed it to a next process.

6. The apparatus for manufacturing sheets as claimed in any one of claim 2 to 5, wherein said web forming device comprises an extruder, a T-die and a series of processing rolls.

7. The apparatus for manufacturing sheets as claimed in claim 2 or 3, wherein said sheet material forming device comprises a first cutting means which cuts the web fed from said web forming device in a predetermined width and a second cutting means which cuts said web in a predetermined length.

8. The apparatus for manufacturing sheets as claimed in claim 7, wherein the first cutting means of said sheet material forming device are rotary blades and the second cutting means are cutter blades.

9. The apparatus for manufacturing sheets as claimed in claim 1, wherein said processing means comprises a corner cutting means which cuts the corner portions of sheet materials.

10. The apparatus for manufacturing sheets as claimed in claim 9, wherein said processing means comprises a score forming means which forms a folding score near a side edge of said sheet material

* * * * *

UNITED STATES PATENT AND TRADEMARK OFFICE

CERTIFICATE OF CORRECTION

PATENT NO. : 5,267,848

DATED : December 7, 1993

INVENTOR(S) : Akio Totsuka

It is certified that error appears in the above-indentified patent and that said Letters Patent is hereby corrected as shown below:

Column 2, line 45: delete "so"

Column 3, line 54: "or" should read --of--

Column 8, line 59: delete "s"

Column 17, line 36: after "numeral" insert --as those in Fig. 1 denote the same members or devices. As--

Signed and Sealed this

Ninth Day of August, 1994

*Attest:*

Bruce Lehman

BRUCE LEHMAN

*Attesting Officer* *Commissioner of Patents and Trademarks*